United States Patent [19]

Winans

[11] Patent Number: 5,307,265
[45] Date of Patent: Apr. 26, 1994

[54] COMPUTER METHOD AND SYSTEM FOR COMMUNICATION IN A MULTI-LINGUAL NETWORK

[75] Inventor: Louis A. Winans, Endicott, N.Y.

[73] Assignee: International Business Machines Corporation, Armonk, N.Y.

[21] Appl. No.: 704,662

[22] Filed: May 20, 1991

Related U.S. Application Data

[63] Continuation of Ser. No. 291,923, Dec. 29, 1988, abandoned.

[51] Int. Cl.⁵ .............................................. G06F 15/21
[52] U.S. Cl. ................................ 364/419.01; 395/144
[58] Field of Search ......................... 364/419; 395/144

[56] References Cited

U.S. PATENT DOCUMENTS

| | | | |
|---|---|---|---|
| 4,365,315 | 12/1982 | Jamnik | 364/419 |
| 4,456,969 | 1/1984 | Herzik et al. | 364/419 |
| 4,615,002 | 9/1986 | Innes | 364/419 |
| 4,731,735 | 3/1988 | Borgendale | 364/419 |
| 4,864,503 | 9/1989 | Tolin | 364/419 |

Primary Examiner—Gail O. Hayes
Attorney, Agent, or Firm—John S. Gasper; Michael E. Belk

[57] ABSTRACT

A system and method for enabling a networking product for National Language Support (NLS) that presents end users with a single-system-image view of the network, preserves the independence of individual installations with respect to language enabling, and minimizes the amount of data that must be transmitted through the network to effect program-to-program communications. In addition, it provides a method and system for communicating messages from program to program in a standardized, program-readable format, free from the language text that would be used to communicate the same messages to human readers.

22 Claims, 21 Drawing Sheets

```
┌─────────────────────────────────────────────────┐
│ NAME OF NODE SENDING THE BUFFER                 │
│ NAME OF USER (OR DEVICE) AT THE ABOVE NODE      │
│ NAME OF NODE TO WHICH BUFFER IS BEING SENT      │
│ WHO GETS IT AT THE DESTINATION NODE             │
│ FLAGS    │ LENGTH   │ LANGUAGE │   CL           │
│ THE DATA ITSELF -->                             │
└─────────────────────────────────────────────────┘
```

FLAGS DEFINED IN THE FLAGS FIELD:

1. CONTROL — INDICATES THAT THE DATA PACKET IS EITHER A SESSION INITIATION PACKET, A SESSION TERMINATION PACKET, A PACKET CONTAINING A NON-INTERACTIVE COMMAND, OR A PACKET CONTAINING A MESSAGE FOR A NON-INTERACTIVE USER. IT ALSO INDICATES THAT THE PACKET MUST BE PROCESSED BY THE NETWORK MANAGER AT EACH NODE.

2. MESSAGE — INDICATES THAT THE PACKET CONTAINS A MESSAGE FOR A NON-INTERACTIVE USER.

3. COMMAND — INDICATES THAT THE PACKET CONTAINS A NON-INTERACTIVE COMMAND.

4. INITIATION — INDICATES THAT THE PACKET IS A SESSION INITIATION PACKET, WHICH IS USED FOR ESTABLISHING AN INTERACTIVE SESSION BETWEEN AN INTERACTIVE USER AND AN APPLICATION.

5. TERMINATION — INDICATES THAT THE PACKET IS A SESSION TERMINATION PACKET, WHICH IS USED FOR TERMINATING AN INTERACTIVE SESSION BETWEEN AN INTERACTIVE USER AND AN APPLICATION.

6. SPECIAL — INDICATES THAT THE PACKET CONTAINS A MESSAGE FOR A NON-INTERACTIVE "USER", ACTUALLY A PROGRAM, AND IS TO BE TRANSMITTED TO THAT PROGRAM VIA A SPECIAL INTERFACE PROVIDED BY THE UNDERLYING OPERATING SYSTEM VS. THE OPERATING SYSTEM'S NORMAL MESSAGE DISPLAY FACILITIES.

7. NLS — INDICATES THAT THE NODE WHERE THE PACKET ORIGINATED SUPPORTS NLS.

8. ENCODED — INDICATES THAT THE MESSAGE IN THE PACKET'S DATA FIELD IS IN ENCODED FORM.

ADDITIONAL DEFINITIONS:

LENGTH —THE LENGTH OF THE DATA CONTAINED IN THE PACKET'S DATA FIELD.

LANGUAGE —A NUMBER WHICH UNIQUELY IDENTIFIES, AT THE NODE OF THE PACKET'S ORIGIN, THE LANGUAGE THAT SHOULD BE USED FOR ANY RESPONSES TO THE USER'S NON-INTERACTIVE COMMAND.

CL —THE LANGUAGE COMPATIBILITY LEVEL OF THE NODE WHERE THE PACKET ORIGINATED.

FIG.1

| NAME OF NODE SENDING THE BUFFER | | | |
|---|---|---|---|
| NAME OF USER (OR DEVICE) AT THE ABOVE NODE | | | |
| NAME OF NODE TO WHICH BUFFER IS BEING SENT | | | |
| WHO GETS IT AT THE DESTINATION NODE | | | |
| FLAGS | LENGTH | LANGUAGE | CL |
| THE DATA ITSELF --> | | | |

FLAGS DEFINED IN THE FLAGS FIELD:

1. CONTROL — INDICATES THAT THE DATA PACKET IS EITHER A SESSION INITIATION PACKET, A SESSION TERMINATION PACKET, A PACKET CONTAINING A NON-INTERACTIVE COMMAND, OR A PACKET CONTAINING A MESSAGE FOR A NON-INTERACTIVE USER. IT ALSO INDICATES THAT THE PACKET MUST BE PROCESSED BY THE NETWORK MANAGER AT EACH NODE.

2. MESSAGE — INDICATES THAT THE PACKET CONTAINS A MESSAGE FOR A NON-INTERACTIVE USER.

3. COMMAND — INDICATES THAT THE PACKET CONTAINS A NON-INTERACTIVE COMMAND.

4. INITIATION — INDICATES THAT THE PACKET IS A SESSION INITIATION PACKET, WHICH IS USED FOR ESTABLISHING AN INTERACTIVE SESSION BETWEEN AN INTERACTIVE USER AND AN APPLICATION.

5. TERMINATION — INDICATES THAT THE PACKET IS A SESSION TERMINATION PACKET, WHICH IS USED FOR TERMINATING AN INTERACTIVE SESSION BETWEEN AN INTERACTIVE USER AND AN APPLICATION.

6. SPECIAL — INDICATES THAT THE PACKET CONTAINS A MESSAGE FOR A NON-INTERACTIVE "USER", ACTUALLY A PROGRAM, AND IS TO BE TRANSMITTED TO THAT PROGRAM VIA A SPECIAL INTERFACE PROVIDED BY THE UNDERLYING OPERATING SYSTEM VS. THE OPERATING SYSTEM'S NORMAL MESSAGE DISPLAY FACILITIES.

7. NLS — INDICATES THAT THE NODE WHERE THE PACKET ORIGINATED SUPPORTS NLS.

8. ENCODED — INDICATES THAT THE MESSAGE IN THE PACKET'S DATA FIELD IS IN ENCODED FORM.

ADDITIONAL DEFINITIONS:

LENGTH — THE LENGTH OF THE DATA CONTAINED IN THE PACKET'S DATA FIELD.

LANGUAGE — A NUMBER WHICH UNIQUELY IDENTIFIES, AT THE NODE OF THE PACKET'S ORIGIN, THE LANGUAGE THAT SHOULD BE USED FOR ANY RESPONSES TO THE USER'S NON-INTERACTIVE COMMAND.

CL — THE LANGUAGE COMPATIBILITY LEVEL OF THE NODE WHERE THE PACKET ORIGINATED.

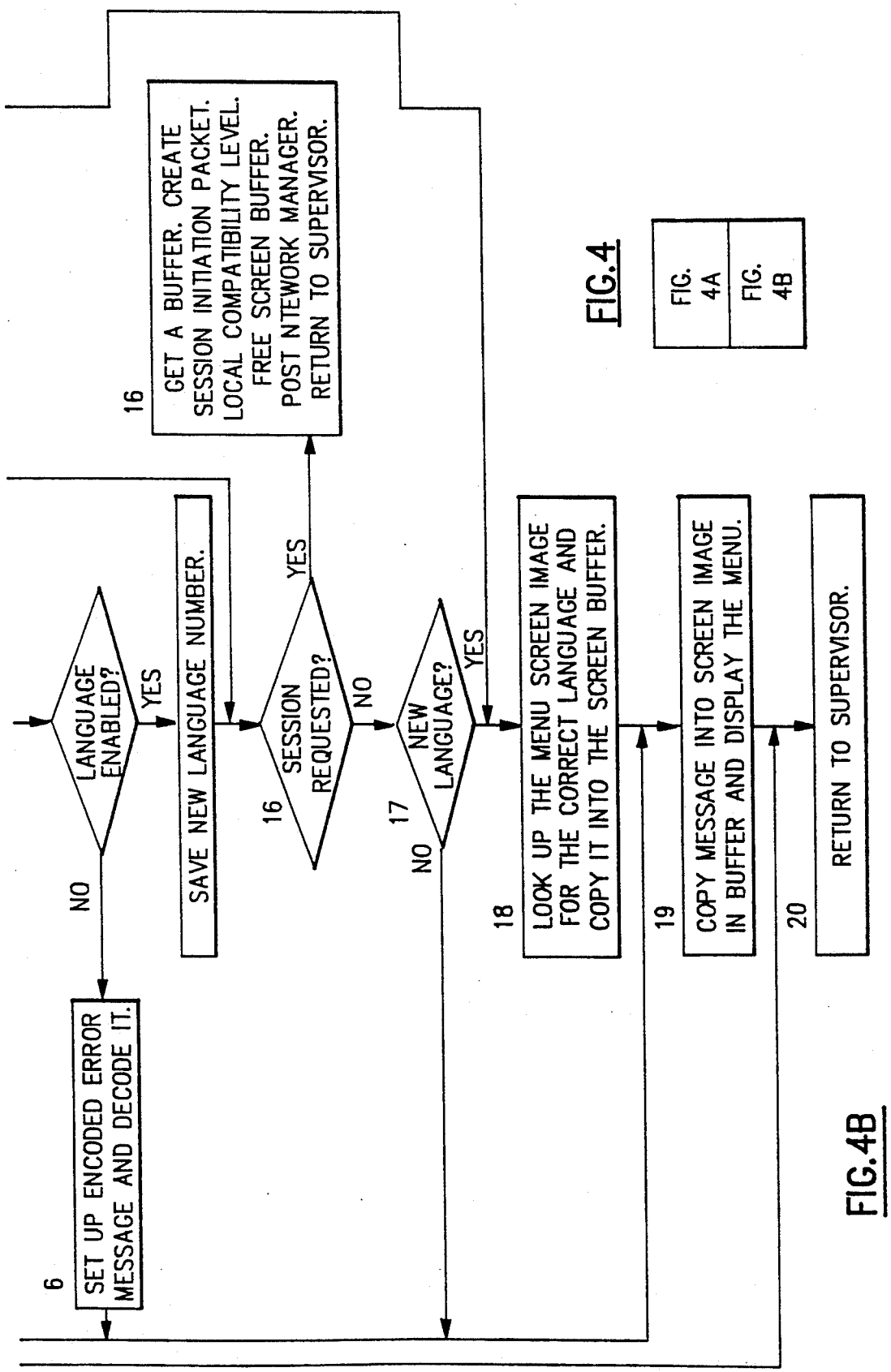

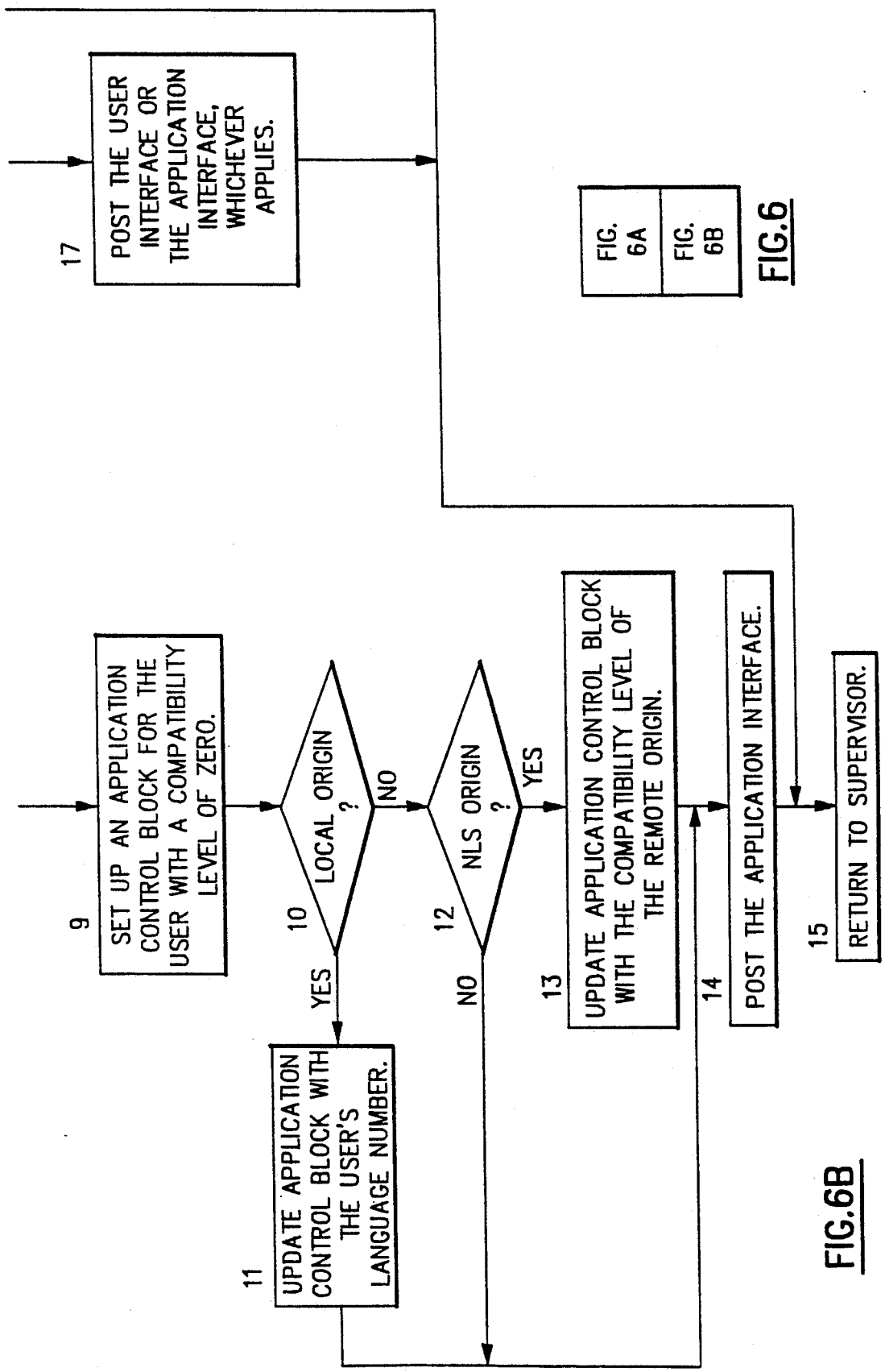

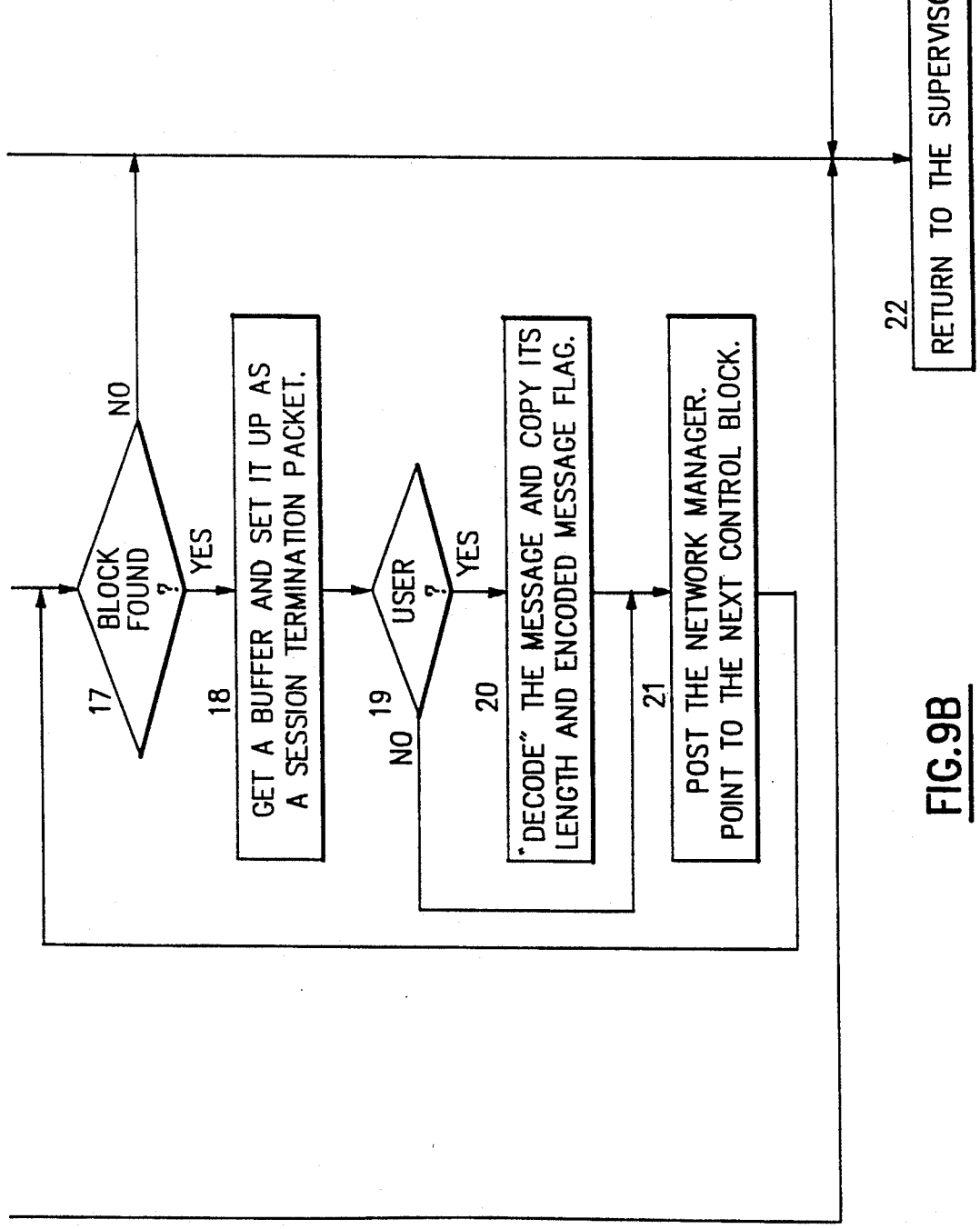

5,307,265

COMPUTER METHOD AND SYSTEM FOR COMMUNICATION IN A MULTI-LINGUAL NETWORK

This application is a continuation of application Ser. No. 07/291,923, filed Dec. 29, 1988, now abandoned.

The invention relates generally to network communications systems, and more particularly to providing a method for sending program-to-user communications for viewing by user in the language for which his node is enabled.

BACKGROUND OF THE INVENTION

In the intense competition to market computer products throughout the world, the comparative user-friendliness of hardware and software products is becoming an increasingly important factor in separating the winners from the losers. In an international, multilingual marketplace, therefore, a product's ability to communicate with users in their own native languages has begun to emerge as a matter of significant importance.

Basic to this National Language Support (NLS), as it is sometimes called, is the provision for defining the textual material which a program communicates to users, usually in the form of messages or screens, in separate files or data sets which can easily be translated into other languages. This source object is then processed, if necessary, by a special program to convert it into object code format for use by the program.

The simplest form of NLS support occurs in a single-user product, in which a language object is loaded into memory, replacing an installation-specified default, when the user selects a language. The program then uses the contents of that language object when communicating with the user.

A higher level of complexity occurs in a multi-tasking product which supports multiple users simultaneously, especially if the product is interactive. In this case the program must keep track of which language object to use for each user, and it must keep the language objects in pageable memory for efficiency.

In each of these cases the NLS function which the program must provide is fairly straight-forward. An installation must be able to obtain the language objects it needs for its users—from the product vendor, a third party, or the customer's own translation—and to make those language objects available for the program's use through product "enabling". Each user must then be able to select the language he or she wants the program to use for his or her session.

In the case of a networking product, however, the solution is not so obvious. Consider a small network consisting of nodes "E", "F", and "G", located in England, France, and Germany, respectively, and assume that each is enabled only for its own language.

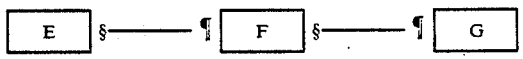

Suppose the communications link between nodes "F" and "G" suddenly becomes inoperative while an English speaking user at node "E" is using an application at node "G" through the network. Node "F" must inform the user at node "E" that the link has become inoperative, but node "F" is not enabled for English, and the user at node "E" does not understand French.

Clearly, the node where a user enters the network must support the language the user wants to use, or the user would not be able to select the language. When the node does not support the user's language, the user can request that the installation install the language, and the installation can respond exactly as it would for a non-networking product, even to the point of providing its own translation.

Unlike a non-networking product, however, the task of providing program-to-user communications for a networking product involves more than one installation, and a large network can consist of hundreds or even thousands of installations, any of which might need to communicate with the user at one time or another.

SUMMARY OF THE INVENTION

As set forth in the following description, the invention provides a method and system for enabling a networking product for National Language Support (NLS) that presents end users with a single-system-image view of the network, preserves the independence of individual installations with respect to language enabling, and minimizes the amount of data that must be transmitted through the network to effect program-to-user communications. In addition, it provides a method and system for communicating messages from program to program in a standardized, program-readable format, free from the language text that would be used to communicate the same messages to human readers. Basically this is done by determining a set of program messages available in the user's language at the node where the user enters the network, identifying the set of program messages to some other node in the network by transmitting the identifying information to said other node through the network, and determining at the other node whether a message to be issued to the user by the other node is included in the set of program messages. The invention further provides for transmitting a message from the other node to the user node in a standardized program-readable format independent of the user's language and reconstructing the message identified in the program-readable format into the user's language at the node where the user entered the network. The invention includes the use of compatibility identification for each node in the network to indicate which collection of messages have been provided to that node.

BRIEF DESCRIPTION OF THE DRAWINGS

FIG. 1 shows a Sample Network Packet of the type used in a presently preferred embodiment of the invention;

FIGS. 4, 4A-4B are a flow chart for the User Interface task;

FIGS. 5, 5A-5B, 6, 6A-6B and 7 are a combined flow chart for the Network Manager task;

FIGS. 9, 9A-9B are a flow chart for the Line Driver task;

DETAILED DESCRIPTION OF THE PREFERRED EMBODIMENT

Figure 2:
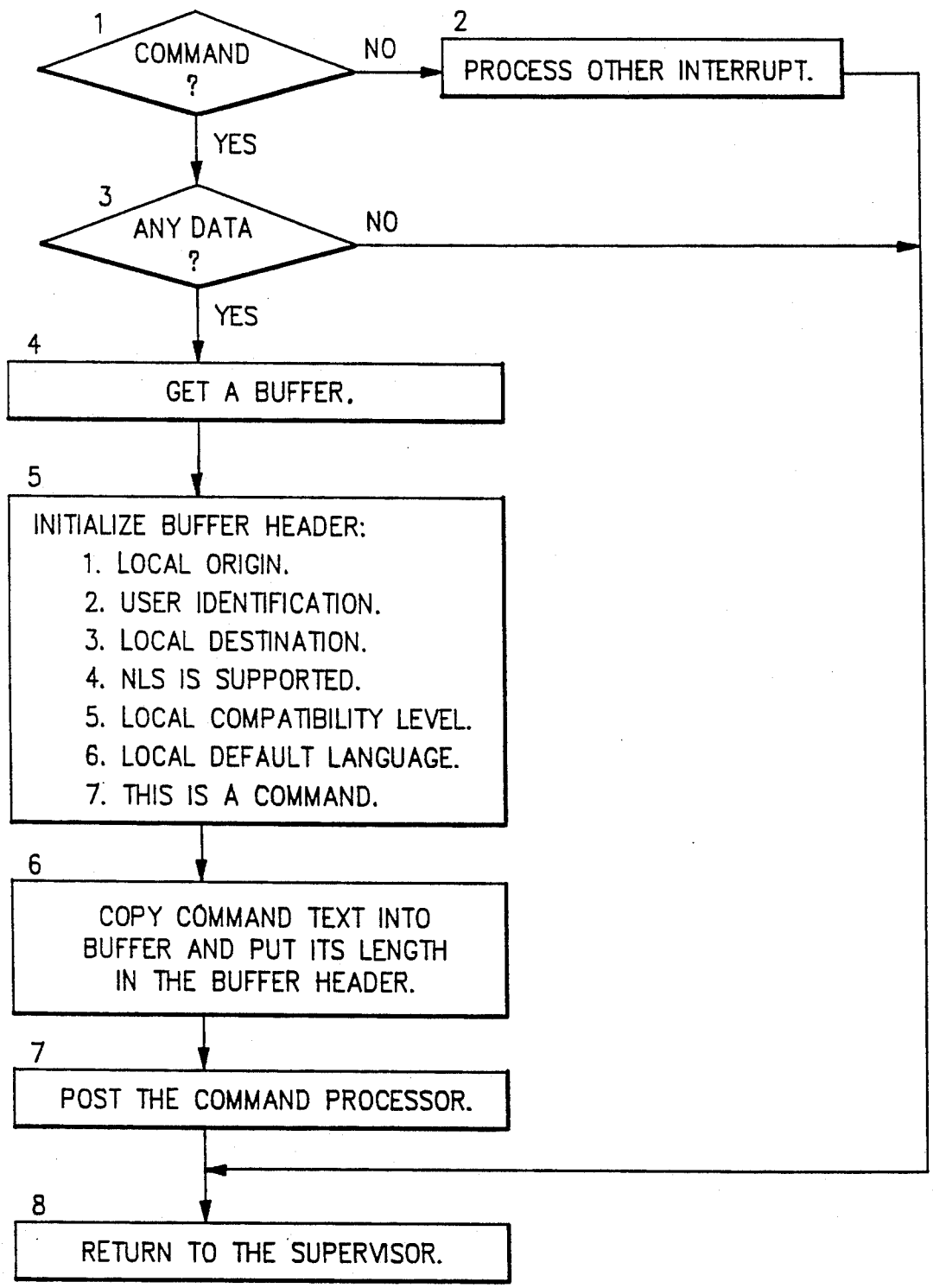
FIG. 2 is a flow chart for the Interrupt Handler module.
Figure 3A:
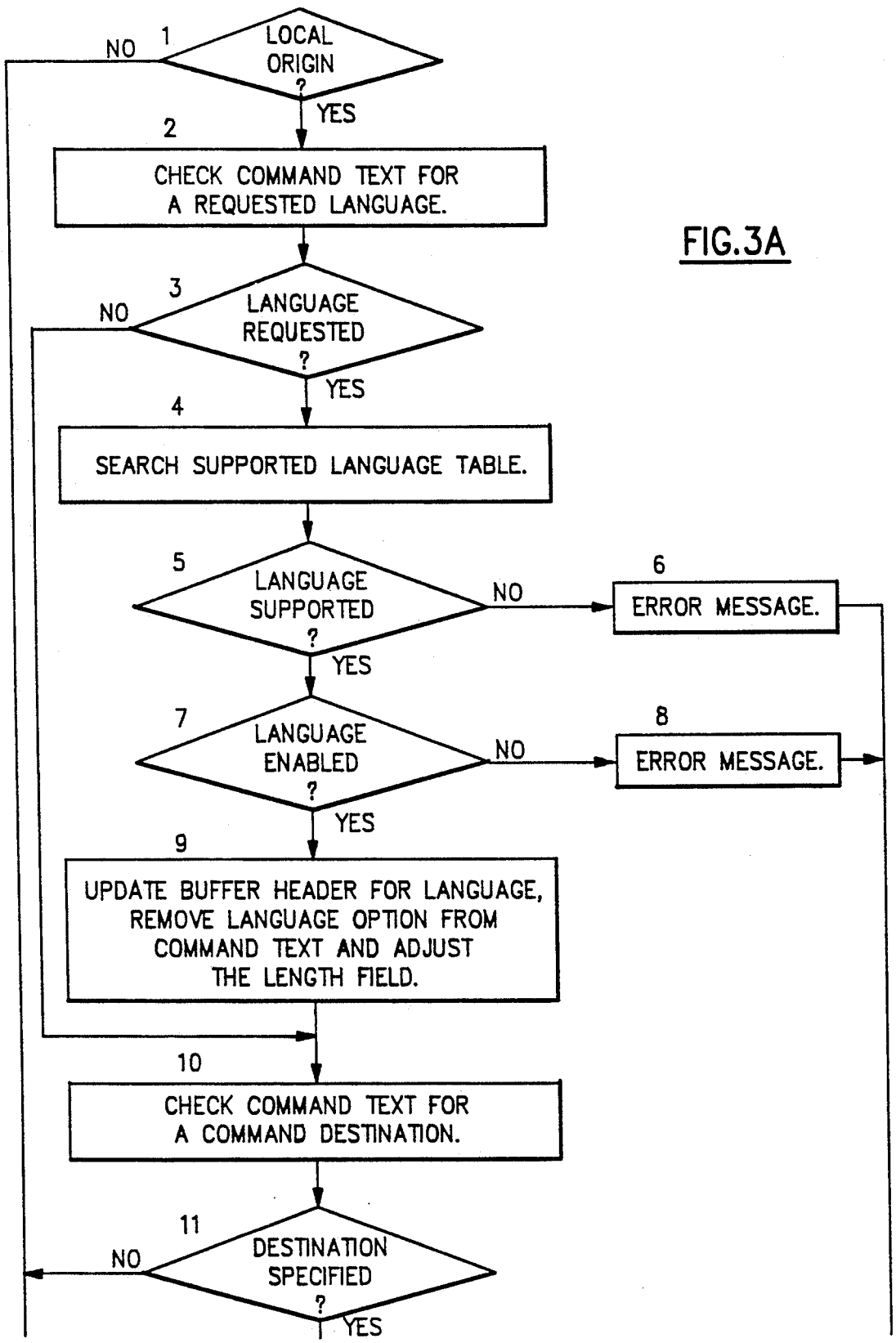
FIGS. 3, 3A-3B are a flow chart for the Command Processor task.
Figure 3B:
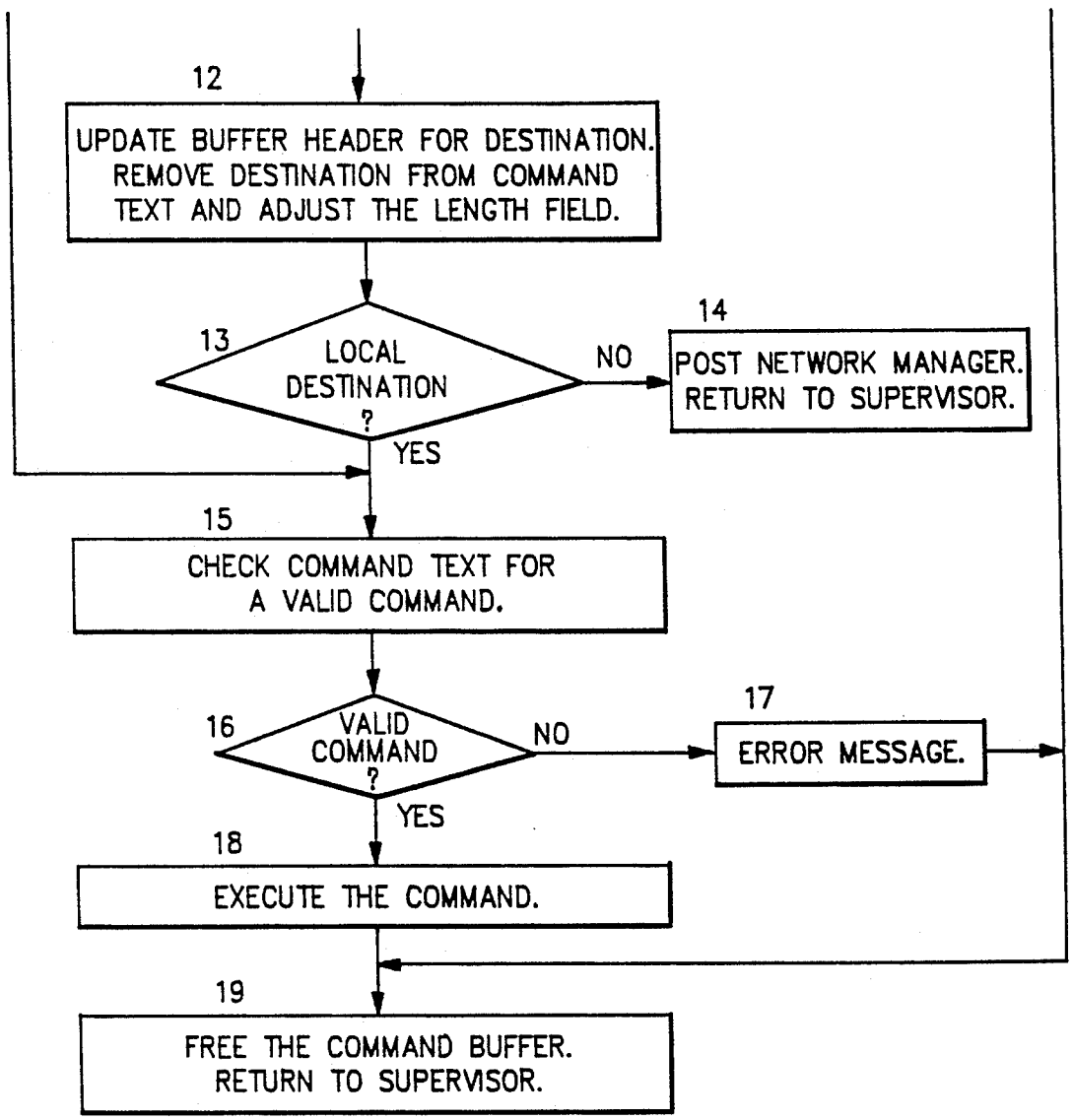
Figure 3:
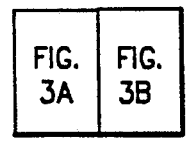
Figure 4A:
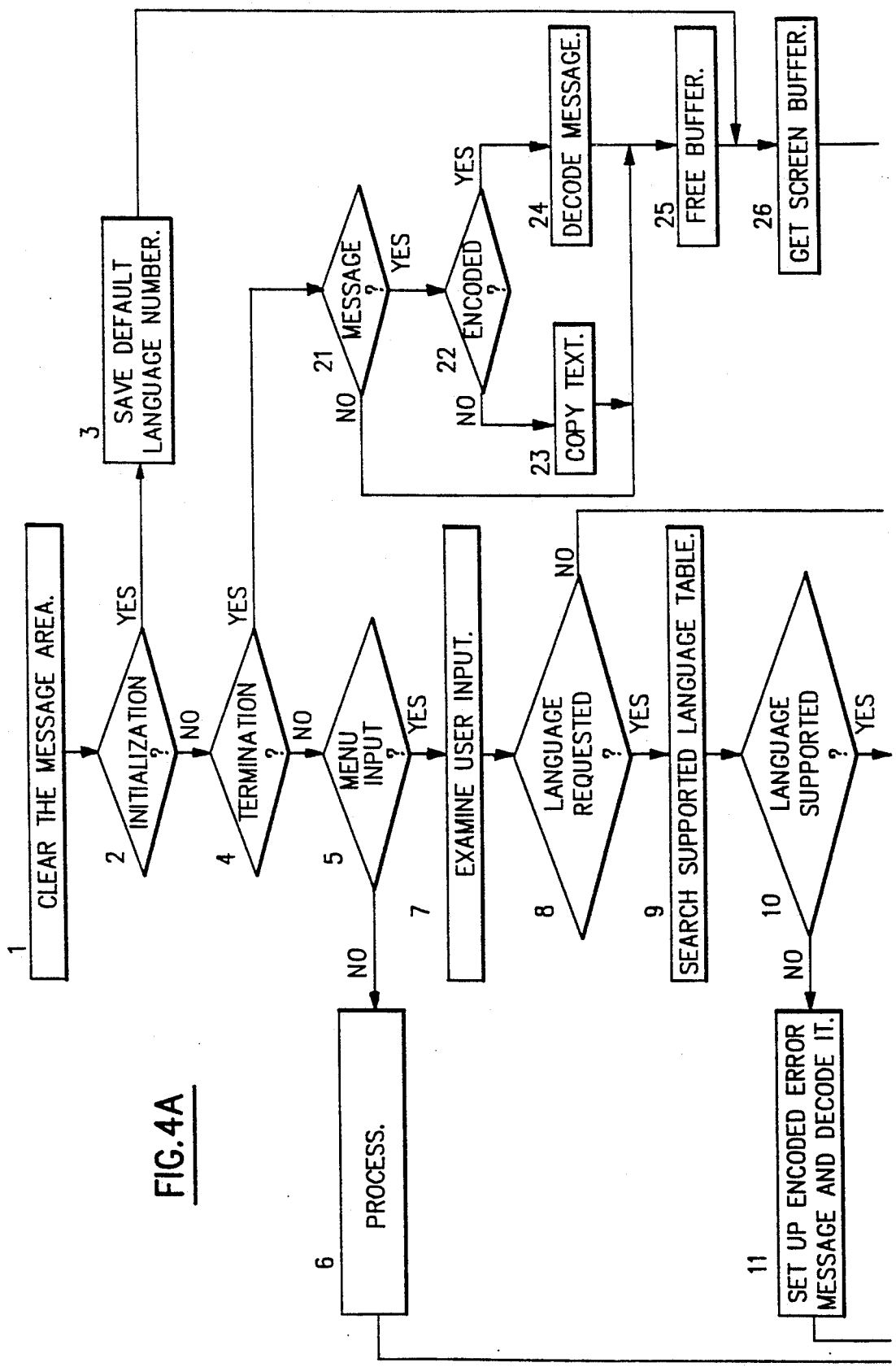
Figure 5A:
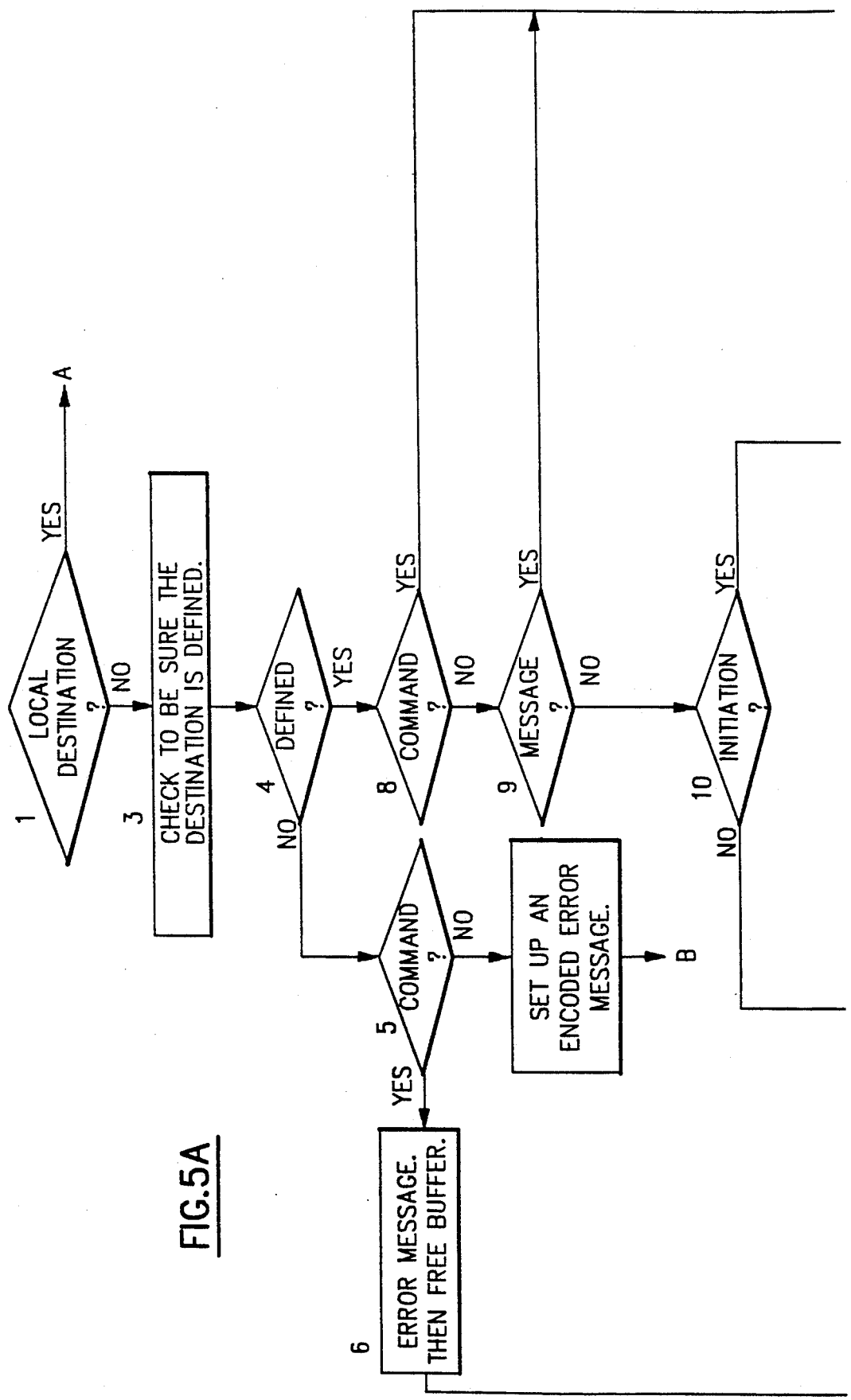
Figures 5, 5B:
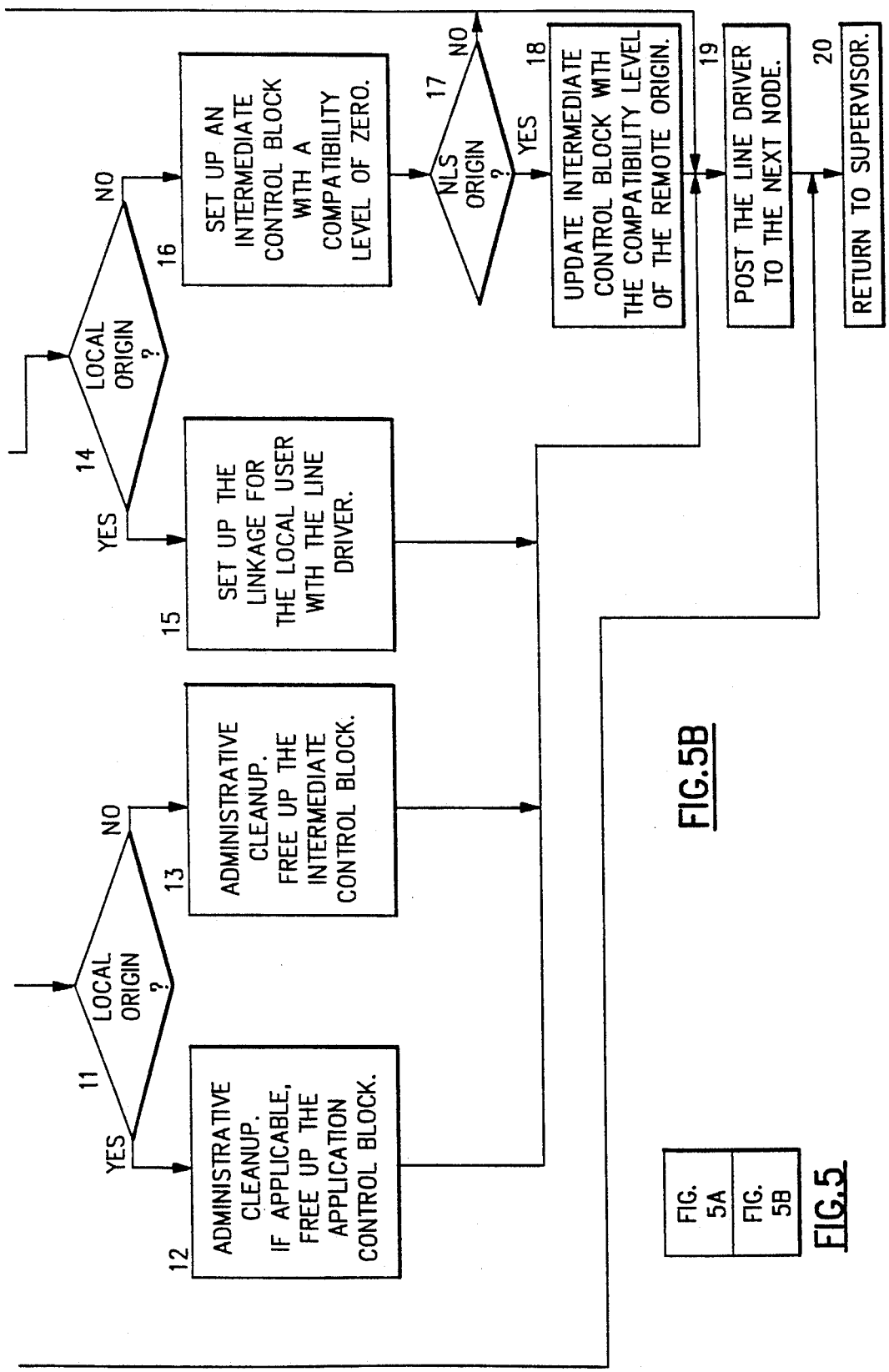
Figure 6A:
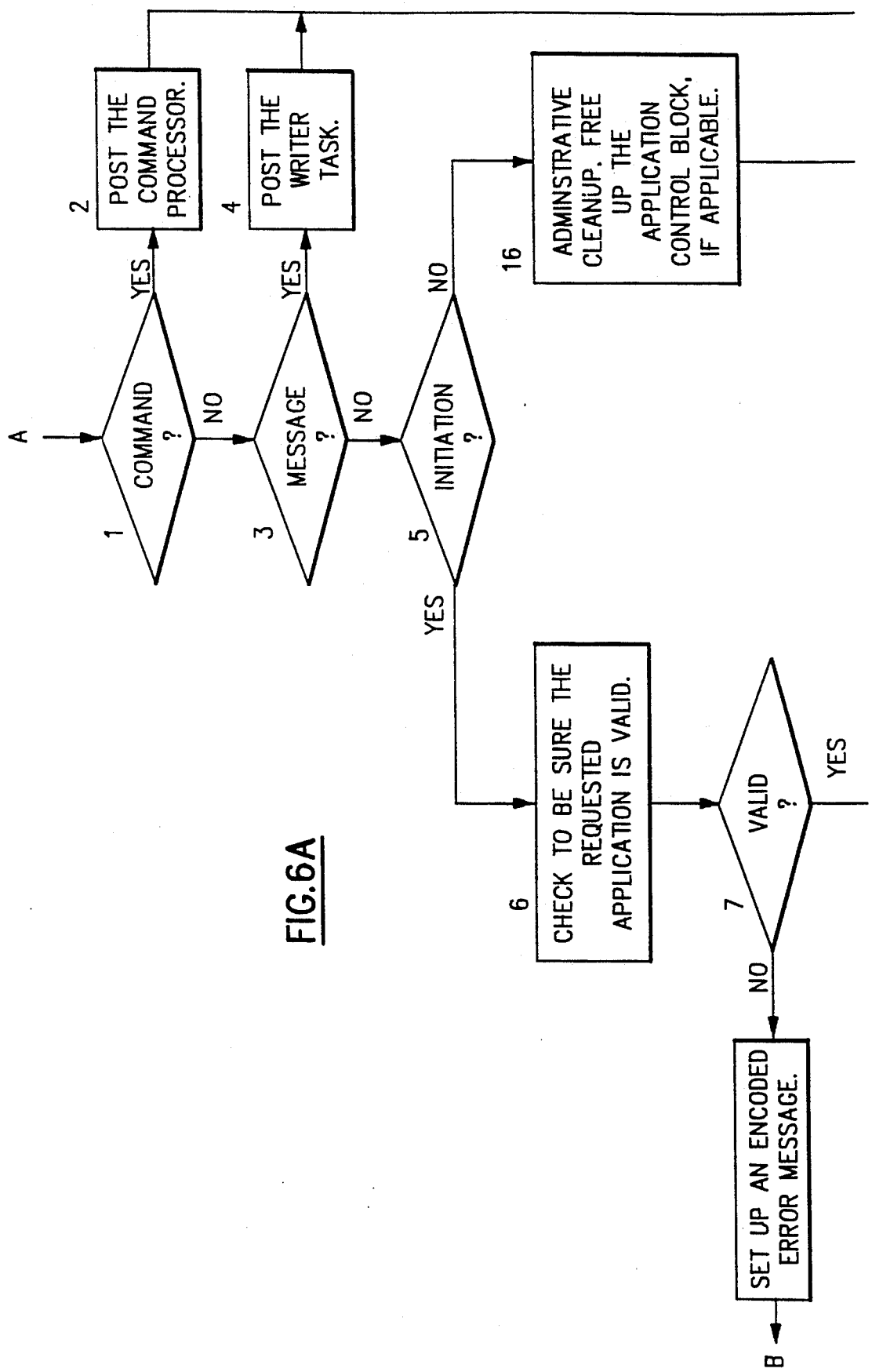
Figure 7:
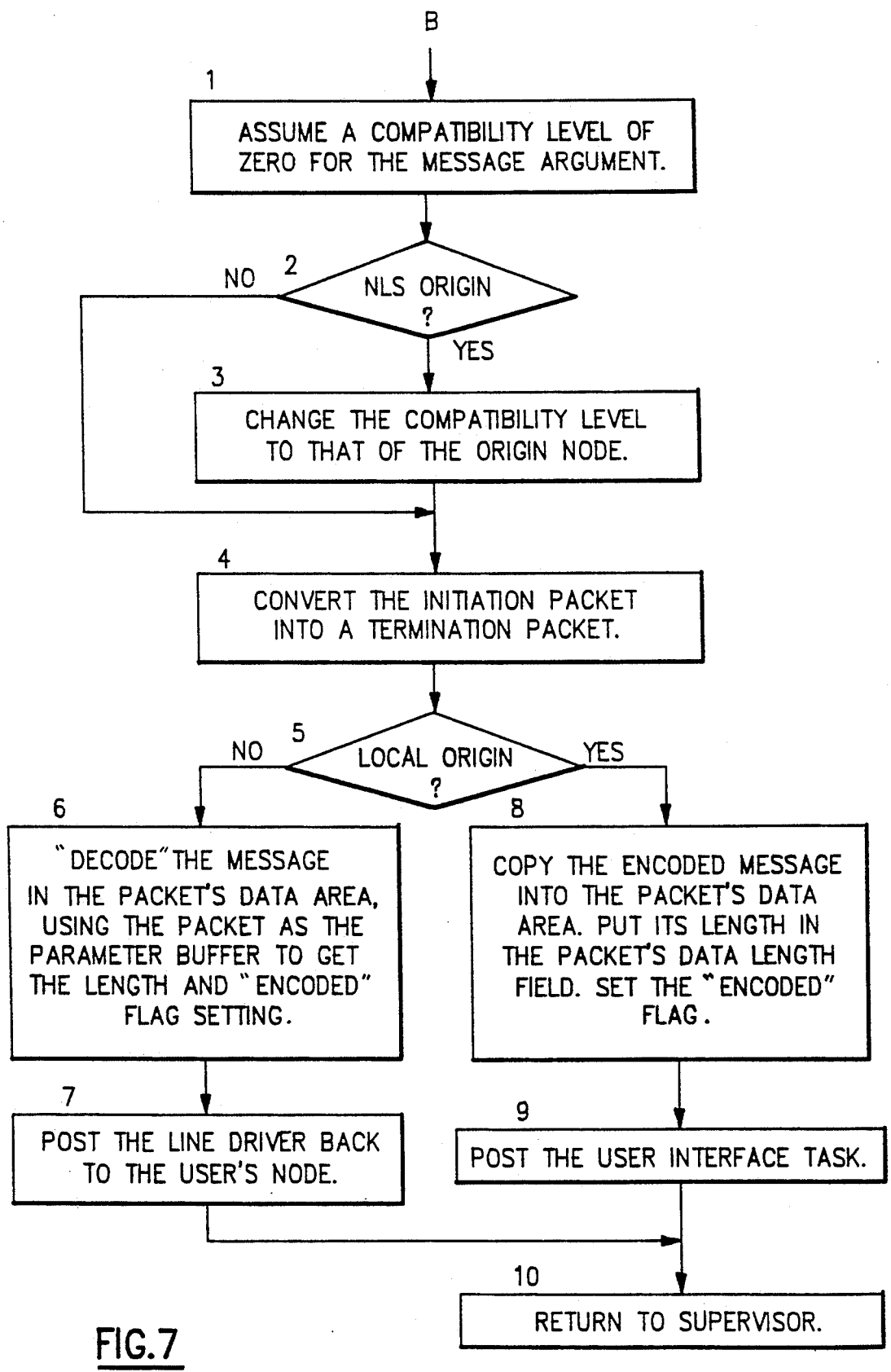
Figure 8:
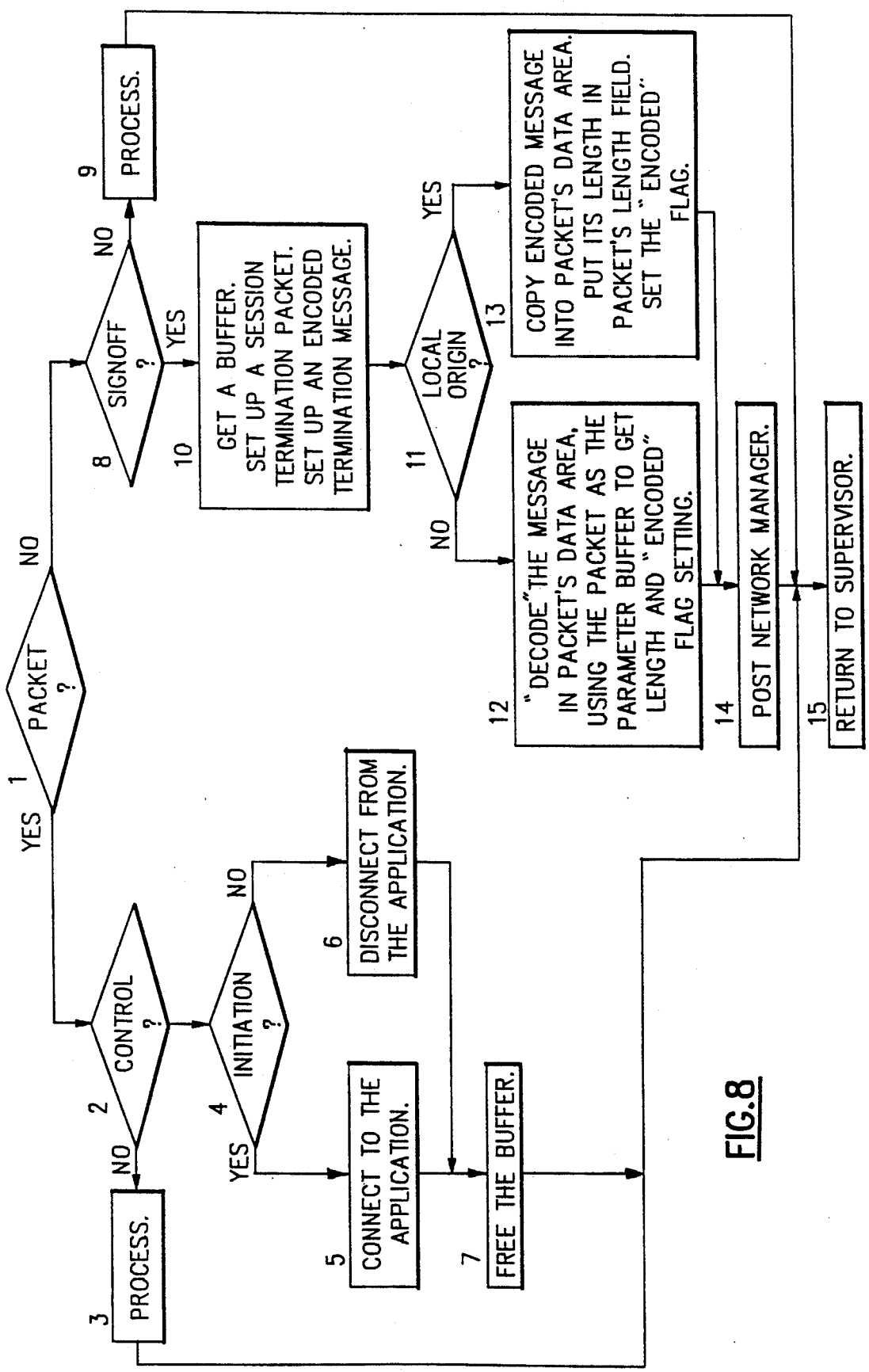
FIG. 8 is a flow chart for the Application Interface task.
Figure 9A:
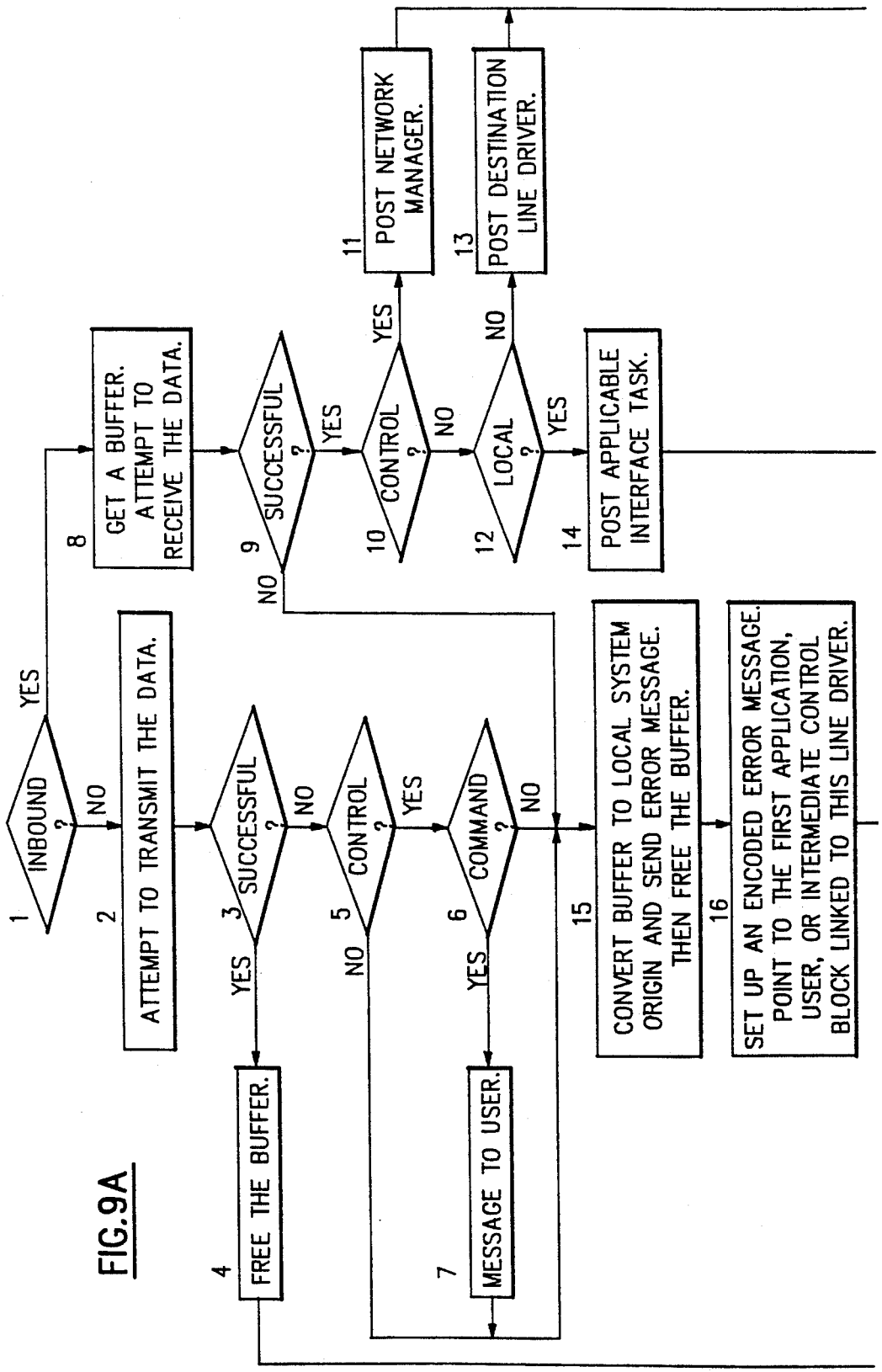
Figure 10A:
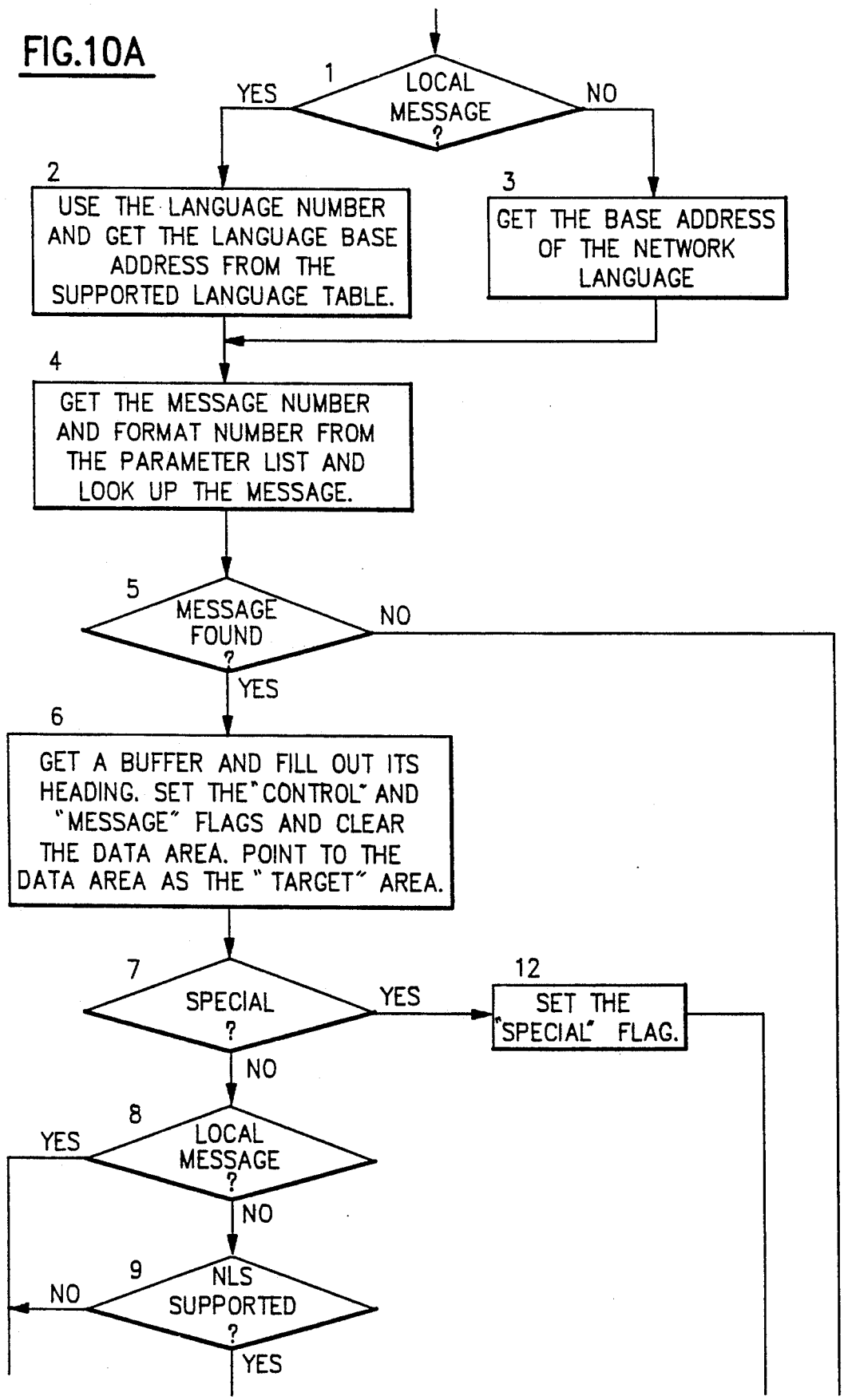
FIGS. 10, 10A-10B are a flow chart for the Primary Message disposition subroutine.
Figures 10, 10A, 10B:
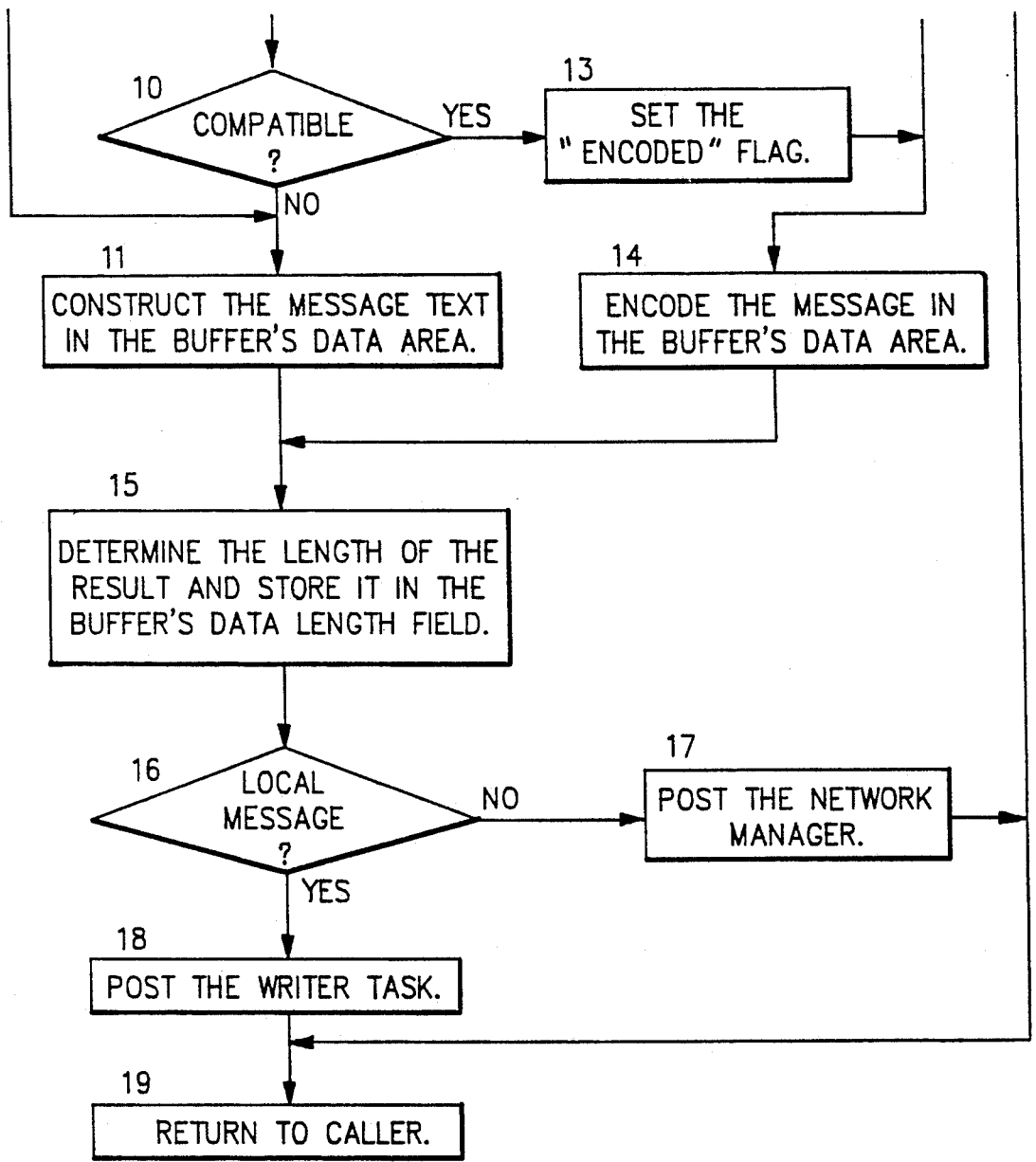
Figure 11:
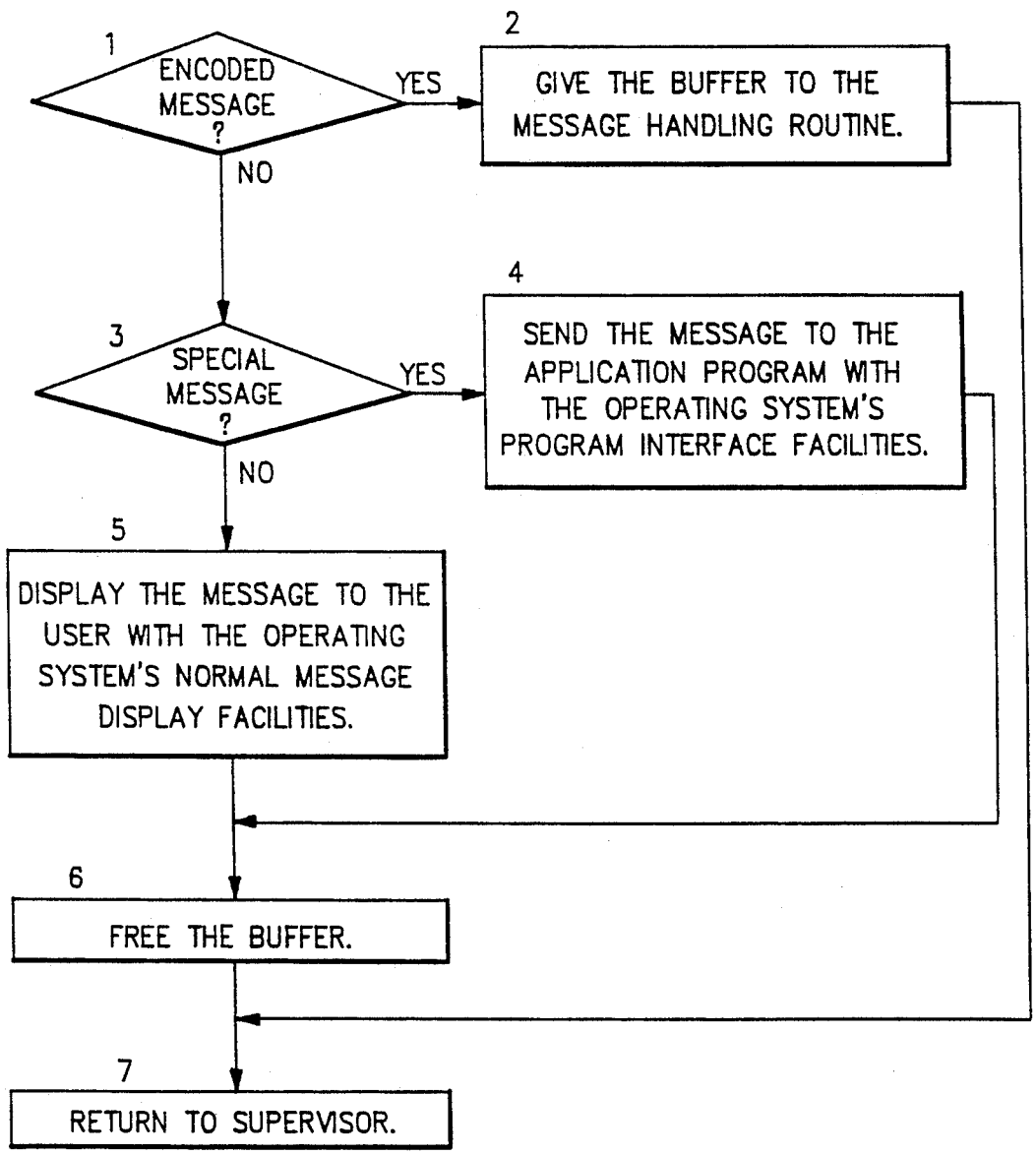
FIG. 11 is a flow chart for the Writer task.
Figure 12:
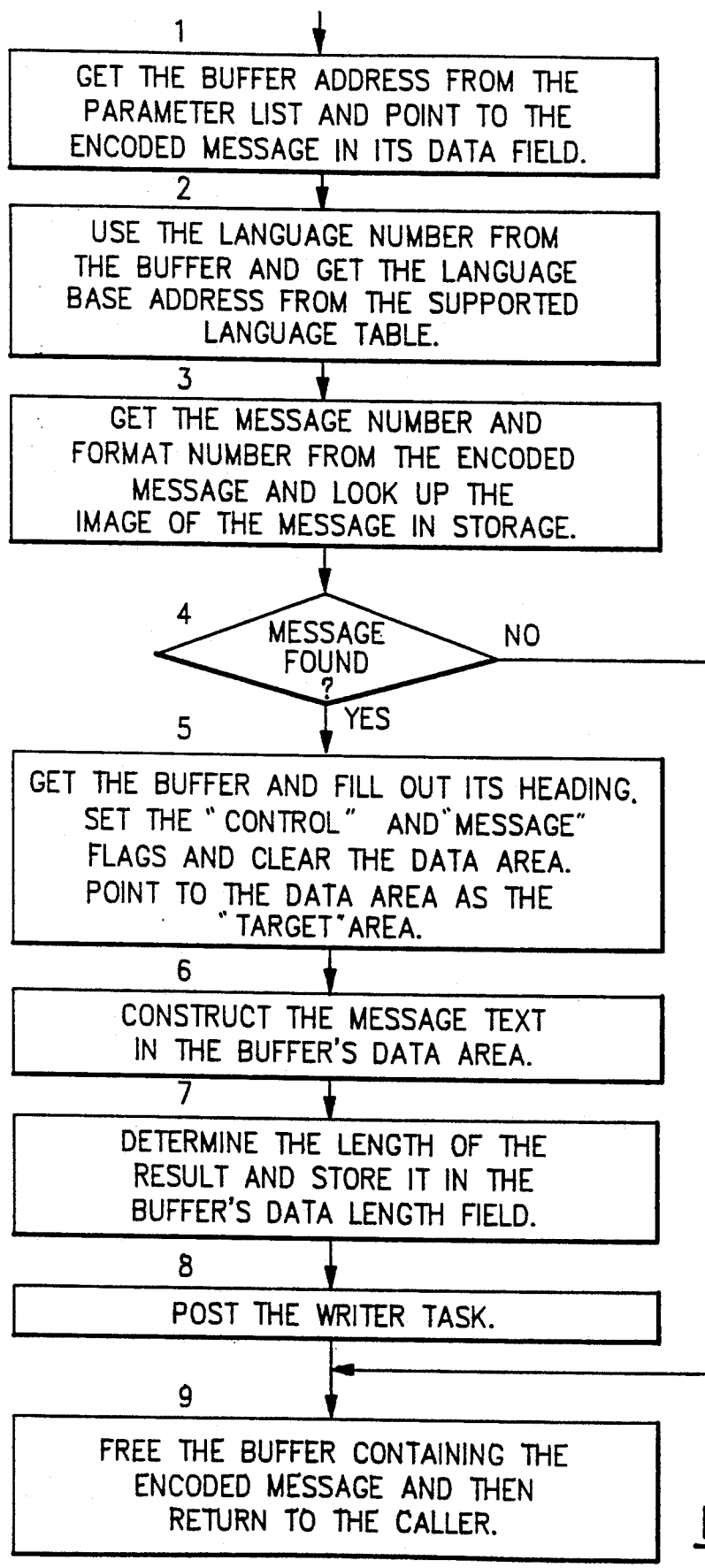
FIG. 12 is a flow chart for the Primary Message decoding subroutine.
Figure 13A:
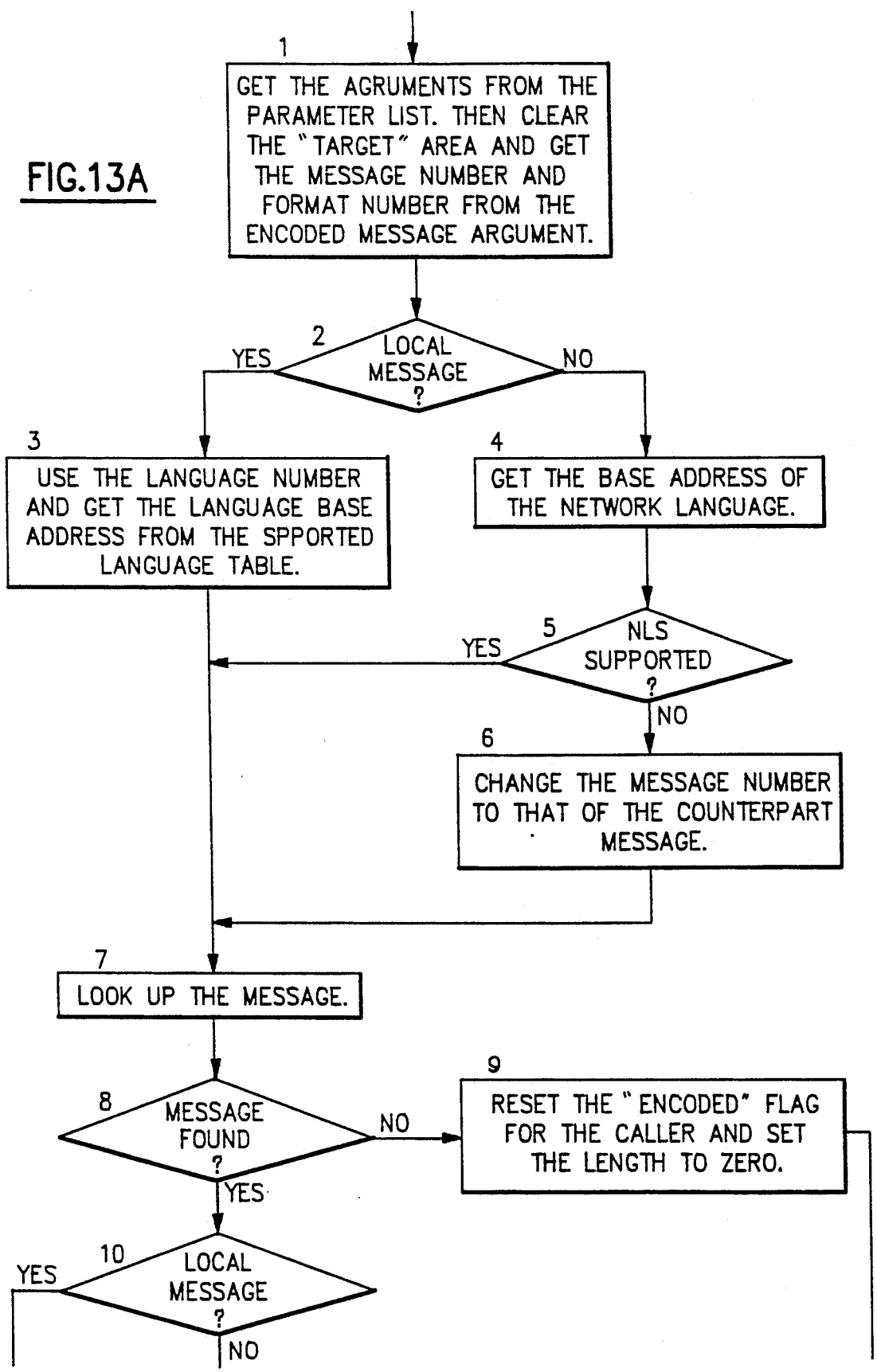
FIGS. 13, 13A-13B are a flow chart for the Interactive Message resolution subroutine.
Figure 13B:
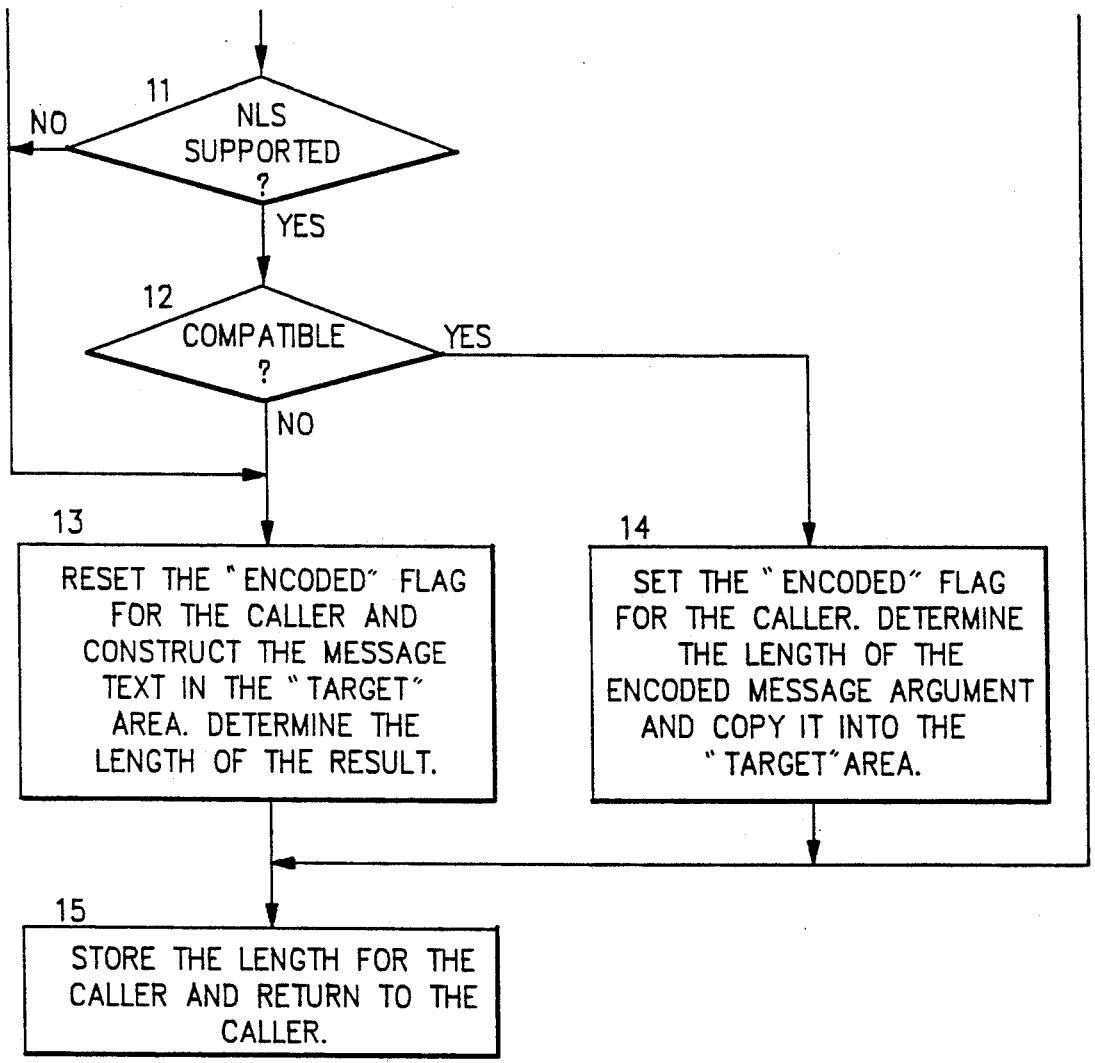
Figure 13:
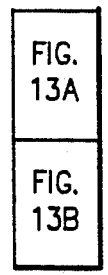
Figure 14:
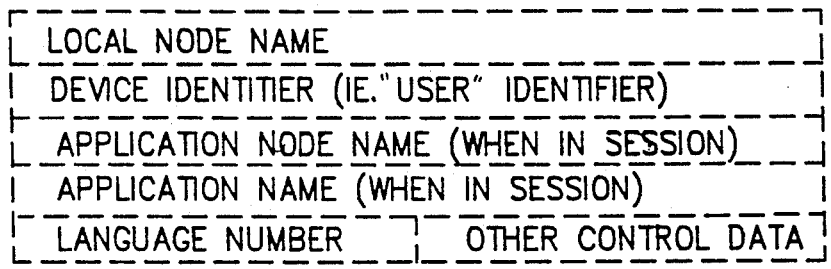
FIG. 14 shows a Sample User Control Block.
Figure 15:
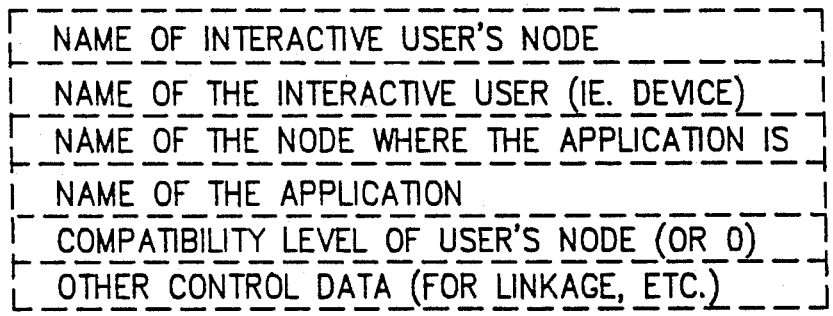
FIG. 15 shows a Sample Intermediate Control Block.
Figure 16:
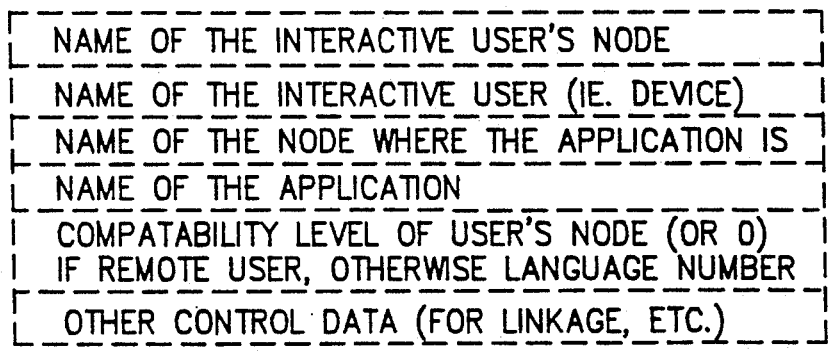
FIG. 16 shows a Sample Application Control Block.

The method for providing NLS support in a networking product that is described in the following paragraphs is aimed at optimizing the user-friendliness of the product for both end users and installations. It requires each installation to be sensitive only to the language needs of users entering the network at its local site. At the same time it makes it appear to each user in the network that every node in the network speaks his or her language—i.e. as though the entire network were a single system. With this method that user at node "E" could receive his or her message in English, even though the issuing node "F" is only enabled for French.

At the heart of this method is what we shall call an "encoded message", which contains all the essential ingredients for constructing a message except the language text. The exact format of the encoded message is unimportant, as long as it is standardized for the product and contains all the information which must be communicated from one node of that product to another in order for the latter, together with one of its local language objects, to construct the appropriate message. The following sample format makes use of several fixed length fields followed optionally by fields describing values that are to be substituted for the message's variables:

Fixed length fields (always present)

| Msg# | Ver# | Module | #Vars |
|------|------|--------|-------| where:

Msg# = the message number

Ver# = the message version or format number

Module = a character string identifying the program module issuing the message (used in the message formats of some products)

Vars = the number of substitution values

Substitution values, if present, follow contiguously, each in the following format:

| #Chars/Flags | Data |
|--------------|------| where:

Chars = the length of the substitution data field (*)

Flags = a set of flags which serves to identify substitution data whose output form has language dependencies (*)

Data = the substitution data (in final output form unless there are language dependencies)

* = Depending on implementation, #Chars and Flags could be a single field, since special length values could be used to indicate special data types.

Let us begin with the simple case where the networking product is a new product with a single release and no service yet applied. If node "F" were issuing a message to a local user, it would simply look up the object code image of the message in the language being used by the user, construct the message, and then display it to the user. While constructing the message it would convert any substitution arguments into output form and place them in the message in the appropriate positions.

When issuing a message to a remote user at node "E", however, node "F" would construct an encoded message instead. Node "E", upon receiving the encoded message, would look up the object code image of the message in the language being used by the user, construct the message, and then display it to the user. While constructing the message it would use the substitution values in the encoded message to replace the substitution variables in the message.

In most cases it would be most efficient for the issuing node, node "F" in this case, to convert the message arguments into output form when constructing the encoded message. The receiving node could then simply copy the arguments into the message directly while constructing the message, the conversions having already been done.

There are some types of arguments, however, whose output form is dependent upon the language in which the value is being expressed. One example of this is a timestamp, and another, especially in a networking product, is the text of a secondary message.

In most language-dependent arguments it is only the display format which is language-dependent. The data itself, such as in the case of a timestamp, is fixed. Therefore, the raw data of the argument can be placed in the encoded message in a fixed format with a flag to alert the receiving node to the type of data in the argument. The receiving node, recognizing the flag, can then format the argument according to the convention of the user's language when substituting that argument for a message variable during message construction. The exact format of such argument data in an encoded message is unimportant, as long as it is standardized for the product.

In the case of a message argument which is itself another message, however, the object code image of the secondary message must be located, the message must be constructed, and the constructed message must be substituted for a variable in the primary message. This must all occur at the receiving node, node "E" in the example, to ensure that all text is in the user's language. In this case the data portion of the argument in the encoded message is itself in the format of another encoded message, and a flag again is used to alert the receiving node to the type of data. This construct lends itself readily to recursive handling in the program.

Messages which are embedded as arguments within other messages usually belong to a special class of messages which are limited to a single output line, which in turn is limited in length. But they are real messages, and they can have their own substitution arguments. They are often displayed by themselves in the limited message display areas of menu screens. To illustrate, node "F" might send the following message to the user at node "E":

The F to G link has gone down

Upon receiving the transmission, node "E" might display a menu to the user with the above message displayed in its message display area. It might then issue the following message to the system operator at node "E", with the same message being used as an argument therein:

DVMMSG999I Session 45 has ended because "The F to G link has gone down"

If node "F" sends the encoded form of the message to node "E", node "E" can provide the message to the user in the user's language and to the operator in the operator's language. It is only necessary that each be using a language for which node "E" is enabled.

Now suppose the product vendor provides a new release of the product in which new messages have been defined. If nodes "E", "F", and "G" all migrate to the new release at the same time, the scenario will remain unchanged. But suppose node "F" migrates to the new release while node "E" does not. There will still be no problem if the message which node "F" sends to node "E" is one that was defined in the first release. But if the message is a new one, defined in the new release, node "E" will not be able to "decode" the encoded message, because that message will not have been defined in its language objects.

This situation can be handled as follows:

1. Associate a "compatibility level" with each message defined in a language object, or at least with each "networking" message, such that the level is the same for all messages defined in a given "release" of the product and either higher or lower for those defined in subsequent "releases". (Assume, for purposes of discussion, that the level is incremented to a higher number for messages added in later releases.)

2. Consider the highest compatibility level in an installation's language objects—i.e. the compatibility level of those messages defined in the most recent "release" of the product—to be the installation's compatibility level.

3. Provide for an installation-specified "network" language, which can be any language for which the installation has enabled the product, but need not be the installation-specified default for users entering the network at the local site.

The exact manner in which the compatibility level is associated with a message in a language source object is unimportant, as long as the compatibility level is stored with the object code image of the message and as long as the highest compatibility level associated with any message is placed in a field for access by the program using the language object. If the program which processes the language source object to produce the object code is sophisticated enough to process the messages in any order, for example, the compatibility level can be established for a whole set of new messages simply by coding a control line in front of the new message definitions. Otherwise, the compatibility level might need to be established for each message individually.

It is physically impossible to issue a message in a user's language if that message is not defined anywhere in the network in that language. The "network" language is a compromise by which installations can agree on a common language to be used when that situation occurs. Presumably, the language selected would be the most universally understood language in the context of the network with the most universally supported character set.

When the user at node "E" begins an interactive session with an application at node "G" through the network, node "E" sets up a control block which includes information identifying the user's language. Node "E" then forwards a session initiation packet to node "F" in which it has placed, among other things, its own compatibility level. Node "F" saves the compatibility level of node "E", along with other things, in its own control block and then forwards the packet to node "G". Node "G" also sets up a control block for the session and saves the compatibility level of the user's node, node "E", along with everything else it needs.

When the communications link between nodes "F" and "G" becomes inoperative, node "F", upon seeing that the user is located at a remote site, looks up the appropriate message in its network language and compares the compatibility level of the message with the compatibility level of the user's installation. If the compatibility level of the message is higher than that of the user's installation, node "F" constructs the message in its network language and sends that to the user, because the user's installation is backlevel with respect to that message. Otherwise, node "F" constructs and sends the encoded message to node "E". Included in the message packet which node "F" sends to node "E" is an indication as to whether the message in the packet's data field is encoded.

If the message which node "F" is sending to the user at node "E" calls for a secondary message as a substitution argument, node "F" must also look up the secondary message and make the same determination as to whether node "E" is compatible for receiving the encoded form of that message, provided the encoded form of the primary message is being used. If node "E" is compatible for both messages, node "F" would construct the encoded message as described earlier, using a flag to alert node "E" to the presence of the embedded encoded message.

If node "E" is compatible for the primary message but not for the secondary message, node "F" would construct the secondary message in its network language and include that as the argument in the primary encoded message. In this case no flag would be needed, since the argument would already be in output form. If node "E" is not compatible for the primary message, node "F" would construct the entire message in its network language. It would never embed an encoded message inside a message which is not encoded.

Not all network traffic need be interactive. If the user at node "E" were just sending a message or file through the network to a user at node "G", the nodes handling the traffic would not maintain control blocks in the manner described above. In this case both the information identifying the user's language and the compatibility level of node "E" would be stored in the control data portion of the packet(s) forwarded through the network. Any node needing to send a message back to the user would obtain the compatibility level of node "E" from one of those packets, and it would return the language-identifying information to node "E" in the packet containing the message.

In each of these situations only the user's local node would be concerned with the language being used by the user. Therefore, the information identifying a user's language could be a single number associated with the user's language at his or her local node. A single number would require a minimum amount of space in control blocks and network packets, and it would not matter whether the same number had been used for a different language at another node.

Note that only users entering the network at back-level nodes would have to view some of their messages in the network language of other nodes, since any node running the latest release of the product would be compatible for receiving any message in the network in encoded form. This method could, therefore, provide an incentive for all nodes to migrate to the product's latest release.

Now let us consider messages added to the networking product between releases, such as through product service or installation modification. These messages could be assigned the compatibility level which applies for the release of the product that is being serviced or modified, and this would always work well for messages which are strictly issued at the local site. It would also work well for networking messages, as long as all installations running that release of the product, or a later release, were to install the service or modification to their language objects.

Frequently, however, not all installations choose to apply service, and not all installations could be expected to be willing to apply modifications written by other installations. A user entering the network at an installation choosing not to apply such service or modifications to its language objects would never see the added messages, because his or her local node would appear to the rest of the network to be compatible for receiving those messages in encoded form, even though those messages would not be defined in its language objects.

In the case of service provided by the product vendor, these messages could be blended into the compatibility scheme so that they would work exactly as those defined in product releases—that is if the vendor were willing to distribute replacement language objects whose contents are cumulative.

To illustrate, let us assume that there are two releases of a product, whose messages were assigned compatibility levels of one and two, respectively. The vendor then chooses to distribute some new function for the product through its service distribution process, the reason being that the amount of new function is not large enough to justify a new release. Assigning a compatibility level of three to the new messages, the vendor distributes complete replacements for the language objects along with the code changes.

An installation choosing to install the new function would have a compatibility level of three, and its language objects would contain all compatibility level one messages, all compatibility level two messages, and all compatibility level three messages. This would be true even if the installation were running the first release of the product. Language compatibility levels are functionally independent from product release levels. In fact, messages added in the next release of the product—release three in this example—would be assigned a compatibility level of four.

The situation just described, however, is atypical, because the service process is primarily for providing code fixes for problems. It could be cumbersome for a vendor to have to assign a new compatibility level and distribute cumulative language objects whenever a message is added to some release of the product in conjunction with a code fix, especially if the vendor's service organization is separate from its development organization. Furthermore, it would be virtually impossible for an installation modification to be handled in this manner.

This situation can be handled by setting an arbitrary limit to the product's compatibility levels and then deliberately assigning a compatibility level that is outside that limit to each message added to the product between releases, such that no remote site will ever be compatible for receiving that message in encoded form. If the highest compatibility level supported by the product were 125, for example, a compatibility level of 126 could be assigned to any message added to the product between releases, but the program processing the language source objects would not count the 126 when determining the compatibility level of the installation. The result would be that any message added to the product between releases would always be issued to remote sites in the network language of the node which added and is issuing the message, because the compatibility level of remote installations would always be less than 126.

Messages added to the product through product service could be captured in the compatibility scheme in the next release of the product, effectively keeping the compatibility scheme manageable by keeping it in the hands of the product's development organization. While a node issuing a message added to its language objects between releases, either through service or installation modification, would be obligated to always issue that message to remote sites in its network language, a node running a later release in which the same message had been included in the compatibility scheme would not.

Of the three alternatives—adding the messages at an existing compatibility level, adding the messages at a new compatibility level and replacing language objects with cumulative language objects, or adding the messages so that remote sites will not be compatible for receiving them in encoded form—the best one for a product vendor to use for adding messages in conjunction with service would depend on the vendor's service organization and strategies. The last of the three, however, would probably be best for adding messages in conjunction with installation modifications.

Now suppose that one or more releases of a networking product existed prior to the release in which the product began supporting NLS, and suppose the product vendor wants the pre-NLS and NLS-supporting releases of the product to be able to coexist in the same network. This support can be provided as long as the architecture of the product's network packets can accommodate the information needs of both pre-NLS and NLS-supporting releases without conflicts and without requiring changes to pre-NLS code. Consider the following:

1. An NLS-supporting user node, such as node "E" in the examples, must be able to alert other NLS-supporting nodes that it is capable of supporting NLS. A flag which is not used by pre-NLS releases is ideal for this purpose, as long as it is always initialized by pre-NLS releases to a known value.

2. An NLS-supporting user node must be able to communicate its installation compatibility level to other NLS-supporting nodes, and the field used, whether new or old, must not conflict with existing uses of the same field by pre-NLS releases.

3. In some cases an NLS-supporting node must be able to store the language-identifying information for a user in a network packet, so that another NLS-supporting node can return that information to the user's node in the event of returning an encoded message. As illustrated earlier, this requirement occurs when the user is not involved in a session, but rather is sending a message, file, command, or similar data to a remote site and might, or might not, receive a response. Again, the fields used for this information must not conflict with existing uses of the same fields by pre-NLS releases.

4. When an NLS-supporting node transmits an encoded message to a user node which also supports NLS, it must be able to indicate that the message is encoded. An unused flag would again be ideal, provided it is always initialized to a known value by pre-NLS releases, but this could also be determined from a field in the encoded message after first verifying that the data is long enough to be an encoded message.

Let us assume, as we have in previous examples, that the lowest compatibility level supported by the product is one. When the user at node "E" begins an interactive session with an application at node "G" through the network, node "E" forwards a session initiation packet to node "F". Assuming that node "F" supports NLS, it first examines the "NLS flag" in the session initiation packet to determine whether the user's node, node "E", supports NLS. If it does, it records the compatibility level of node "E" in the control block which it sets up for the session and then forwards the session initiation packet to node "G". The results will be as described in earlier examples.

If node "E" does not support NLS, however, node "F" puts a zero in the control block where it would otherwise have recorded the compatibility level of node "E", effectively treating node "E" as having a compatibility level of zero. It then forwards the session initiation packet to node "G" as before. Since zero is lower than the lowest compatibility level of any message, any message sent to a user at node "E" by an NLS-supporting node will always be in the network language of the NLS-supporting node, because node "E" will never be perceived as being compatible to receive any message in encoded form.

If node "F" is a pre-NLS node, however, it simply sets up its control block and forwards the session initiation packet to node "G". It does not know about the "NLS flag" and does not look for a compatibility level. Any message it sends to a user at any node will be in the language that it has always used, and the flag which NLS-supporting nodes use to determine whether the message is encoded will, without the pre-NLS node's knowledge, indicate that the message is not in encoded form.

In cases where the user is not in session, such as when sending a message or file to another user at a remote site, an NLS-supporting node would examine the "NLS flag" only if it needed to issue a message back to the user, and it would always issue the message in its network language if the user's node did not support NLS. If a pre-NLS node needed to issue a message back to the user in the same situation, it would simply do so in the language it has always used.

If the networking product makes use of screens, such as menu screens, it is very possible that its pre-NLS screens will have to be re-designed for the NLS-supporting releases in order to provide the expansion space needed for translation. It is also likely that the message display areas on these screens will have to be increased in size in order to accommodate the longer messages that will result from translation.

If a product transmits screen images through the network, the method described herein for messages can be applied just as easily to screen images simply by assigning to each screen image a screen number, a version or format number, if needed, and a compatibility level. The encoded form of a screen image could be nearly identical to the encoded form of a message, even to the point where a message to be displayed on the screen could be handled like the secondary messages previously described.

But if the product's screens are handled strictly at the local site, which is often the case, especially for menu screens, and if NLS-supporting releases of the product are to coexist with pre-NLS releases, the NLS-supporting releases must be able to issue messages to users at pre-NLS nodes that will fit in the message display areas of the pre-NLS screens.

This situation can be resolved by providing each NLS-supporting node with a set of what we shall call "counterpart messages", which are untranslated messages expressed in the language that was used for pre-NLS messages and screens and will fit in the message display areas of pre-NLS screens.

It was mentioned previously that a special class of messages is generally used for display in the message display areas of screens. Let us assume that these messages have been assigned internal message numbers from 7000 to 7999. If node "F" needs to issue message 7050 to a user at node "E", and node "E" is an NLS-supporting node, node "F" will transmit message 7050 either in encoded form or in its network language, depending upon whether node "E" is compatible for receiving message 7050 in encoded form. Either way, node "E" will display the message to the user in the message display area of a screen which is in the user's language, and the message will fit, because the screen will have been designed for NLS support.

If node "E" is a pre-NLS node, however, message 7050 in the network language of node "F" might not fit in the message display area of the pre-NLS screen being used by node "E". Therefore, node "F" will issue the "counterpart message" for message 7050 instead. Each defined message in the range, 7000 to 7999, would have a counterpart message, whose meaning would be identical to that of the message for which it is the counterpart.

Counterpart messages should be assigned internal message numbers that can be derived easily. For example, if counterpart messages were assigned internal message numbers from 8000 to 8999, the counterpart message for message 7050 can be derived simply by adding 1000 to the message number.

Since counterpart messages are not translated, only one set of them is needed at any installation. This can be accomplished by having the specification of a network language occur at "compile" time—i.e. as an option to the program which processes the language source objects to convert them into object code. That program could then include the counterpart messages, numbered 8000 to 8999 in the example, in the object code when "compiling" the source object of the network language and exclude them when "compiling" the source object of any language which had not been identified as the network language.

It is sometimes useful for vendor programs to be able to communicate their messages to user-written applications, such as monitoring programs or programs written to gather and process statistics via commands. This can be instead of, or in addition to, displaying the same messages to users.

The problem with this type of communications is that user applications must sift through the language text of messages in order to extract the information they need, usually in the form of substitution values. The task is difficult enough when the messages are in a single language, but it is that much more difficult when the product supports multiple languages.

The problem can be solved by using encoded messages to provide an interface with these user-written applications which is language-independent, as long as the characteristics of the transmission facilities provided by the underlying operating system are taken into account.

For example, if the only method available for transmitting language-independent messages to user-written applications is the underlying operating system's normal message display facilities, the encoded messages must consist entirely of displayable characters. This is because the underlying operating system will normally convert any non-displayable characters into blanks in order to avoid hardware errors.

To illustrate, consider the number 21 as represented in a computer using the EBCDIC standard:

| | |
|---|---|
| Displayable form (in hexadecimal): | X'F2F1' (two characters needed) |
| Binary form (in hexadecimal): | X'15' (one character needed) |

Since programs normally use the binary form for internal numbers and flags, conversions might have to take place when the encoded message is constructed by the vendor program, and the conversion might have to be reversed by the user-written application, depending on the programming language employed.

Sometimes, however, an underlying operating system provides an alternative method for transferring data from one address space to another, and a vendor product might be able to make use of this alternative for communicating its encoded messages to user-written applications. The Special Message Facility provided by IBM's Virtual Machine (VM) operating system is a good example, even though its purpose, unlike its name implies, has nothing to do with messages.

VM's Special Message Facility permits 129 characters of binary data to be transmitted from one virtual machine to a program running in another virtual machine. But it has one small quirk—that being that the X'15' character is interpreted to mean that one command has ended and another one follows. Each occurrence of X'15', therefore, would have to be translated into a different character which would not otherwise occur in an encoded message in order to be able to make use of this facility to transmit an encoded message.

Let us say that the number 255 (X'FF') only occurs within message numbers in the encoded messages of a vendor's product. This being the case, VM's Special Message Facility could be used simply by doubling each occurrence of a message number in the encoded message and then translating each occurrence of X'15' to X'FF'. The user-written application would then have to first translate each occurrence of X'FF' to X'15' and then divide each message number by two. But this procedure would be less complicated than having to convert displayable characters into binary.

The methods described herein are not limited to a single component of a single product, nor are they limited to a single product. The user's node, node "E" in the examples, could just as easily be a workstation or a desktop computer running an application whose function is to check database commands for syntax and put them into internal form for a database manager running on a mainframe, such as node "G" in the examples. Those messages which the database manager might issue to a user through the network could be defined in the language objects of the desktop application along with the desktop application's syntax error messages, and both command syntax checking and language considerations would be off-loaded thereby from mainframe to desktop.

Let us consider a model of a small networking product in which the following components function under the control of a multi-tasking supervisor:

1. Network Manager Task a. Processes network control packets, which include session initiation packets, session termination packets, and non-interactive packets containing either commands or messages. (The CONTROL flag is always set in network control packets to indicate that the Network Manager Task should process it.)

b. Sets up linkages during the initiation of an interactive session to optimize the flow of data and eliminate the need for Network Manager control during the session and sets up the Intermediate or Application Control Block, whichever applies, when the session pertains to a non-local user.

c. Reverses the above process during the termination of a session.

d. Routes packets containing non-interactive commands or messages to their destinations.

2. Writer Task a. Displays messages to non-interactive users using the underlying operating system's normal message display facilities.

b. Transmits data to user-written applications using a special facility presumed to be provided by the underlying operating system when the SPECIAL flag is set in the buffer containing the message.

3. Command Processor Task a. Processes commands entered by non-interactive users.

4. User Interface Task a. Controls a display unit through which interactive users establish and engage in interactive sessions through the network.

b. Displays a menu screen, processes user selections thereon, and creates the session initiation packet when a user has made a session selection.

5. Application Interface Task a. Provides the interface between the networking product and an application being used by an interactive user.

b. Creates a session termination packet when the application breaks its connection with the networking product with respect to a user following a normal user signoff.

6. Message Handler a. Invoked as a subroutine to construct and handle the disposition of messages destined for display to non-interactive users.

b. Invoked as a subroutine by the Writer Task to decode an encoded message received from a remote site for display to a non-interactive user and construct it in the user's language for display.
c. Invoked as a subroutine to construct an interactive user message in an area designated by the calling routine.

7. Communications Line Driver Task a. Controls a particular communications line used for communicating with another installation of the product. (The counterpart task controls the same communications line at the other installation.)
b. Creates a session termination packet for each interactive session making use of the communications line when the line is determined to have become inoperative.

8. Interrupt Handler a. Included in the model primarily to show the construction of a command buffer when a command is entered by a non-interactive user.

LANGUAGE IDENTIFICATION

The model networking product assumes the presence of a table of supported languages, which might look like the following:

| Number of languages supported (n) | |
|---|---|
| Address 1 | String identifying language one |
| Address 2 | String identifying language two |
| ... | |
| Address n | String identifying language n |

It is presumed that this table contains an entry for each language that is supported by the model networking product and that there are n entries. It is also presumed that the address field in each entry contains either a zero or the base address of the language object for the identified language, a zero indicating that the installation is not enabled for that language. The string is simply a character string by which users can specify a language either on an interactive menu screen or in the syntax of a non-interactive command.

With this table the base address of a given language can be obtained quickly if either the language number or the string identifying the language is known. It is presumed in this model that the base addresses for the installation's default language and its backup network language, in addition to being in the table, are stored in other memory locations for efficient location.

INTERACTIVE SESSIONS

When a display unit controlled by the modeled networking product is switched on, the User Interface Task for that display unit is given control and displays a menu in the installation's default language. The user can then change the language or select a session using options on the menu. The User Interface Task maintains a User Control Block containing, among other things, a number which uniquely identifies the language currently being used at that display.

Looking at the flow chart for the User Interface Task, the task first clears a message area which it will copy into the message display area on the menu screen just before displaying it (box 1). At initialization (box 2) it places the default language number in the User Control Block (box 3), obtains a buffer for storing the screen image (box 26), uses the language number in the User Control Block to locate the language in the supported language table, locates the screen image for that language, and then copies it into the screen buffer (box 18). Finally, it copies the message area which it cleared in box 1 into the message display area of the screen image and displays the menu (box 19).

When the User Interface Task gets control because the user has made a change on the screen (box 5), it first checks whether the user changed the language (box 8). If so, and the indicated language is available (boxes 10 and 11), the task stores the number which identifies the language in the User Control Block (box 14). The new language is then used the next time the menu is displayed, because the logic will flow through box 18.

When the user selects a session (box 15), the User Interface Task creates a session initiation packet in which it sets the NLS flag and places the local node's compatibility level (box 16). It then "posts" the packet to the Network Manager, which simply means that the packet is queued up as a piece of work for the Network Manager. The Network Manager will eventually be dispatched by the multi-tasking supervisor to process that piece of work.

Let us say that the user described above is at node "E" and has selected a session with an application at node "G". Looking at the flow chart for the Network Manager (1 of 3), the task will see that the destination of the packet, node "G", is not local, since the local node is node "E" (box 1). Therefore, it checks to be sure node "G" is defined—i.e. that node "E" knows to send the packet to node "F" in order to get it to a destination called "G" (box 3). The logic then flows through boxes 4, 8, 9, 10, and 14 to arrive at box 15, where the task sets up some linkage between the User Interface Task and the Line Driver Task which handles the communications with node "F", so that those two tasks can post each other directly while the session is active. Finally, it posts the Line Driver Task with the session initiation packet (box 19).

Looking at the flow chart for the Line Driver Task, the task attempts to transmit the data in the packet to node "F" (box 2), since the destination of the packet is node "G"—not node "E" (box 1). Upon success (box 3) it simply frees the buffer that was being used for the data at the local site (box 4).

Meanwhile, the Line Driver Task at node "F" is dispatched to handle the incoming data (box 1) and gets a buffer to contain the data at node "F" and attempts to receive it (box 8). Upon success (box 9) it will see that the CONTROL flag is set in the packet (box 10) and posts it to the Network Manager at node "F" (box 11).

The Network Manager logic at node "F" flows through boxes 1, 3, 4, 8, 9, 10, and 14 to arrive at box 16, where the task sets up an Intermediate Control Block due to the fact the node "F" is neither the origin nor the destination of the session initiation packet. It places a compatibility level of zero in the control block, which would indicate that the user's node does not support NLS, and it sets up linkage between the two line drivers—the one which controls communications with node "E" and the one which controls communications with node "G". However, upon finding that the NLS flag is set in the packet (box 17), it changes that compatibility level to the one indicated in the packet (box 18). Finally, it posts the packet to the line driver which handles communications with node "G" (box 19).

The line drivers between nodes "F" and "G" do the same as described previously for those between nodes "E" and "F", so the packet ends up being posted to the Network Manager at node "G".

The Network Manager at node "G" finds that it is the destination of the session initiation packet (box 1), so it proceeds to "A" on the second flow chart for the Network Manager (2 of 3). Its logic then flows through boxes 1, 3, and 5 to arrive at box 6, where it checks to be sure the application requested by the user is available at node "G".

Upon finding that the requested application is available (box 7), the task sets up an Application Control Block for the session (box 9) as well as linkage between the incoming line driver and the Application Interface Task. Since the user is not located at node "G" (box 10) and the NLS flag is set in the packet (box 12), it changes the compatibility level in the control block to the one indicated in the session initiation packet (box 13). Finally, it posts the packet to the Application Interface Task (box 14).

Looking at the flow chart for the Application Interface Task, the task finds that it has been posted with a session initiation packet (boxes 1, 2, and 4), so it establishes the connection with the application (box 5).

At this point all of the linkages are established for the interactive session to proceed without Network Manager control, and the networking product would simply act as a conduit between the user and the application. The next time the networking product itself would need to communicate with the user is when the session is terminated, whether for normal or abnormal reasons.

To terminate the interactive session, a session termination packet would be passed through the network in a manner similar to that described above for session initiation, except that the Network Manager tasks at the various nodes would be reversing their procedures with respect to the linkages and control block setup. A session termination packet being sent to the user node would most likely contain a message, whereas one being sent to the application node, which would only be needed if the session were being terminated abnormally, would not.

NON-INTERACTIVE COMMANDS

Now let us consider the non-interactive situation. Looking at the flow chart for the Interrupt Handler, when a non-interactive user enters a command, the Interrupt Handler sets up a command packet whose data field contains the command entered by the user and posts it to the Command Processor.

Looking at the flow chart for the Command Processor, when the command has been entered at the local site (box 1), the task first checks the command text to see whether the user indicated a language for any command responses (box 2). (It is presumed that the command syntax allows this and also the specification of a node name where the command should be executed. In addition, the command syntax could allow, although not shown in the flow chart, for specification that the response should be in language-independent form via special facilities presumed to be provided by the underlying operating system in this model.)

If a language was specified (box 3) it is looked up in the table of supported languages to find out whether the installation is enabled for it (boxes 4, 5, and 7). If so, the LANGUAGE field in the command packet is changed to contain the number which identifies the user-specified language, the language option is edited out of the command text, and the packet's length field is changed accordingly (box 9).

Next, the task checks the command text for a destination option, whereby the user might have entered a destination where the command should be executed (box 10). If so, the node destination field in the packet header is changed from the local node name to the one specified in the command, and the command text and the packet's length field are adjusted as described previously for the language option (boxes 11 and 12). The destination field is then checked in box 13, and the packet is posted to the Network Manager (box 14) if the command is to be executed at a remote site.

Finally, a command that is to be executed at the local site is executed, as long as it is valid (boxes 15, 16, 18, and 19). Note that any command which did not originate at the local site (box 1) is executed at the local site. This is because this will only occur in the modeled networking product when the command processor has been posted by the Network Manager with a command packet already determined to be destined for the local site.

MESSAGE HANDLER (construction and disposition of primary messages)

Let us look first at the modeled message handler for non-interactive messages, and let us say that its input when invoked for the construction and disposition of such messages consists of the following:

1. The number of the message plus its version or format number.

2. A character string which identifies the name of the calling module,

3. The number of substitution arguments being passed,

4. For each substitution argument, its address plus a flag indicating its data type, such as number, character, timestamp, or encoded message. (A timestamp argument would be in its language-independent form, and an encoded message argument would be used when a secondary message is called for in the primary message—i.e. the encoded message argument would be the secondary message in its encoded form.)

5. The address of a buffer (packet) whose heading contains all the information which it would contain if the packet were being used as a command packet.

Looking at the message handler flow chart for handling a primary message, the message handler first looks at the node name in the origin field of the 5th input argument to determine whether the message is to go to a local or remote user (box 1). If the message is going to a local user, it uses the language number from the LANGUAGE field in the same buffer to locate the user's language in the supported language table (box 2) and get the language's base address. Otherwise it uses the base address of the network language (box 3).

Either way it then locates the internal object image of the message (box 4) and, assuming the message is defined in the language object (box 5), obtains a buffer and sets it up to contain the non-interactive message (box 6). In setting up the buffer header, the message handler reverses the destination and origin fields from what they are in the input buffer, which is set up as for a buffer containing a non-interactive command.

If the SPECIAL flag is set in the input buffer (box 7), it also gets set in the buffer to contain the message (box 8), and the message is constructed in the buffer's data area in its encoded form (box 14). Otherwise, the message is either constructed in the language determined in box 2 or 3 (box 11) or constructed in its encoded form (box 14). Note that if the message is going to a remote user, the message handler knows whether the remote site supports NLS by the NLS flag setting in the input buffer's FLAGS field (box 9), and it sets the ENCODED flag (box 13) and encodes the message only if the remote site's compatibility level (the CL field in the buffer) is at least as high as the compatibility level of the message as indicated with its object image.

The message handler finally sets the LENGTH field in the packet containing the message (box 15) and posts either the Writer Task (box 18) or the Network Manager (box 17), depending on whether the message is going to a local or remote user (box 16).

When the message handler either constructs (box 11) or encodes (box 14) the message, it uses the substitution arguments provided by the caller in the parameter list.

WRITER TASK

Looking next at the flow chart for the Writer Task, the task first checks to see whether the arriving message is in its encoded form (box 1) as indicated by the setting of the ENCODED flag in the packet. If it is NOT encoded the task either displays the message to the non-interactive user (box 5) or sends the message to the user-written application using a facility presumed to be provided by the underlying operating system for the sake of this model (box 4), depending on the setting of the SPECIAL flag in the message packet (box 3). Otherwise, the task hands off the packet containing the encoded message to the message handler at its primary message decoding entry point (box 2).

MESSAGE HANDLER (primary message decoding)

Looking at the flow chart for the message handler's primary message decoding entry point, the only input to the message handler is the address of the packet containing the encoded message, because the packet itself contains everything else that needs to be known. The message handler simply looks up the object image of the message and constructs the message in the data field of another packet whose heading is identical to that of the packet containing the encoded message except that the ENCODED flag is not set. It then posts the new packet back to the Writer Task.

When the message handler constructs the message in this case, it uses the substitution arguments provided in the encoded message.

MESSAGE HANDLER (interactive messages)

Messages that are presented on the menu screen are simpler than those that are displayed to non-interactive users. Let us say that the input to the modeled message handler for an interactive message consists of the following:

1. The message itself in its encoded form,
2. The address of a "target" area where the message is to be placed in its correct form,
3. An indication as to whether the message is going to a local or remote user,
4. An argument which will be one of the following, depending on whether the message is going to a local or remote user:
a. A language number in the case of a local user,
b. A compatibility level or zero in the case of a remote user.

5. The address of a buffer, which could be a session termination packet.

Let us say that the output of the modeled message handler when invoked for an interactive message is the following:

1. The message in the "target" area in its proper form,
2. The message length placed in the LENGTH field of the input buffer,
3. The ENCODED flag either set or reset in the FLAGS field of the input buffer.

Looking at the message handler flow chart for interactive message handling, the message handler extracts the input arguments before clearing the output "target" area. Therefore, the "target" area could be the same area that had been used to pass the input arguments to the message handler (box 1).

In box 2 the message handler checks whether the message is going to a local or remote user. For a local user it knows that the 4th input argument is a language number, and it uses this to locate the user's language in the table of supported languages and get its base address in box 3.

In the case of a remote user, however, it uses the base address of the network language instead (box 4). This tells it that the 4th input argument is to be interpreted as a compatibility level, with zero indicating that the remote node does not support NLS. If the remote node does not support NLS (box 5), it changes the message number which it obtained from the encoded message argument in box 1 to that of the message's counterpart message (box 6) to ensure its fitting in the message display area of the pre-NLS menu at the user's node.

In any case it then looks up the internal object image of the message in the proper language (box 7). Assuming that the message is defined in the language object (box 8), it will either construct the message in whatever language is indicated by the base address (box 13) or simply copy the encoded message into the "target" area (box 14), resetting or setting the ENCODED flag in the buffer accordingly. The only time it will copy the encoded message into place is when the message is going to a remote user at an NLS-supporting node whose compatibility level is at least as high as the compatibility level of the message as indicated with the object image of the message.

MESSAGES

Let us say that a session initiation packet has reached the Network Manager at node "G" only to find out that the application requested by the user is not available. Looking at the flow chart for the Network Manager (2 of 3), the task determines this at box 7 and sets up an encoded message in preparation for invoking the Message Handler for interactive message processing.

Looking at the Network Manager flow chart (3 of 3) beginning at "B", a message argument value for the compatibility level is initially assumed to be zero (box 1), which would indicate a pre-NLS node of origin. It is then changed to the compatibility level indicated in the session initiation packet if the NLS flag is set indicating that the user's node supports NLS (box 3). The session initiation packet itself is then changed into a session termination packet (box 4).

If the user were located at the local node (box 5), the encoded message itself would be copied into the packet's data area, its length placed in the packet's LENGTH field, and the ENCODED flag set (box 8).

Then the packet would be posted to the User Interface Task (box 9).

For a remote user, however, the message handler is invoked to construct the interactive message in the packet's data area (box 6). The packet's address is provided as the 5th argument to the message handler, and the determined compatibility level (or zero) is provided as the 4th. Therefore, the message handler will have placed the message in the packet's data area in the proper form, the message's length will be in the packet's LENGTH field, and the ENCODED flag will be properly set or reset. The packet is then simply posted to the line driver handling the communications back to the user's node (box 7).

Each of the Network Manager tasks, of course, will perform cleanup operations on the linkage that had been set up for the session and forward the packet to the next destination, and it will finally be posted to the User Interface Task handling the interactive user's display unit.

Looking again at the flow chart for the User Interface Task, the packet is determined to be a session termination packet at box 4, and it is determined to contain a message at box 21. If the message is encoded, as indicated by the setting of the ENCODED flag (box 22), the message handler is invoked to construct the interactive message in the message area that was cleared in box 1. This time, however, the language number in the User Control Block is used as the 4th argument, and the message is constructed in whatever language the user was using.

Looking at the flow chart for the Line Driver Task, if the communications line is detected to be inoperative (either box 3 or 9), the origin fields of the buffer are changed to indicate the local system so as to cause the message handler to send the primary message to a local operator, and the message handler is invoked for the construction and disposition of that message (box 15). Note that the user identification could then be changed, the SPECIAL flag might be set, even the language number could be changed, and the message handler could be re-invoked whatever number of times necessary to send the message to all users concerned.

Then an encoded error message is set up in preparation for invoking the message handler to return an interactive message in the data areas of session termination packets (box 16). The task then goes through all control blocks linked to the particular line driver, creates a session termination packet for each, invokes the message handler for each one destined for a user node, and posts it to the Network Manager (boxes 17, 18, 19, 20, and 21).

In box 20 the message handler knows whether the user is local or remote, since that is one of its input arguments. The argument which is either a language number or a compatibility level (or zero) is obtained from the control block associated with the session—either a User Control Block, an Intermediate Control Block, or an Application Control Block.

If the line driver determines the line to be inoperative while attempting to transmit a non-interactive command (box 6), it invokes the message handler to send a primary message back to the non-interactive user (box 7), using the command buffer itself as the 5th argument to the message handler.

In summary, a method for providing NLS support in networking products has been described which optimizes user-friendliness for end users by presenting them with a single-system-image view of the network, optimizes user-friendliness for installations by preserving their independence from other installations with respect to language support, and minimizes the amount of data that must be transmitted through the network to communicate messages and screens to users at remote sites. It provides for the coexistence of different product releases, including pre-NLS releases, in the same network and for the addition of screens or messages between releases through service or installation modification. In addition, it provides a language-independent message interface between a vendor product and user-written applications. The applicability of the method is limited only by the vendor's imagination.

| LIST OF APPENDICES | | |
| --- | --- | --- |
| Appendix A: | Distributor | Entry points for construction/disposition of primary message |
| Appendix B: | MRETURN | Entry point for returning an interactive message to the caller |
| Appendix C: | MDECODE | Entry point where writer task hands off an encoded primary message to the message handler |
| Appendix D: | SENDLNG | Subroutine of "Distributor" which handles disposition of primary message in a particular language |
| Appendix E: | ENCODE | Subroutine to construct a primary message in its encoded form |
| Appendix F: | GETLINE | Recursive subroutine to construct a line of a message in a particular language. |
| Appendix G: | EMDCODE | Subroutine for handling a secondary message that is embedded as an argument inside a primary message. It calls GETLINE recursively. |
| Appendix H: | TIME | Subroutine to process a time stamp substitution argument, which illustrates handling a language dependent argument other than an embedded message. |
| Appendix I: | CHECKENC | Handing off a buffer containing a primary encoded message to the message handler. |
| Appendix J: | SMSG | Sending a language-independent message to a user-written application via VM's Special Message (SMSG) facility. |

I claim as my invention:

1. A method of communication in a multilingual network including the steps of:
   determining a set of program messages available in a user's language at the node where said user enters the network,
   identifying said set of program messages to some other node in the network by transmitting identifying information to said other node through the network,
   determining at said other node whether a message to be issued to said user by said other node is included in said set of program messages,
   transmitting a message from said other node to said node where the user entered the network in a standardized program-readable format independent of said user's language,
   constructing the message identified in said program-readable format in said user's language at said node where the user entered the network and displaying the constructed message to the user.

2. The method of claim 1 wherein
said transmitting step includes transmitting a program message free from any language dependent text.

3. The method of claim 1 wherein
the standardized program-readable format includes both fixed length fields which are always present and optional fields for variable substitution values.

4. The method of claim 3 wherein
certain ones of the fields are language-dependent, and said displaying step includes converting the message in said language dependent fields into output format at the given node receiving the message.

5. The method of claim 4 wherein
the program message includes a primary message and a secondary message which is a variable in the primary message.

6. The method of claim 3 wherein
none of the fields are language-dependent, and the message is converted into output form at the other node transmitting the message.

7. The method of claim 1 wherein
said transmitting step includes transmitting program messages in an interactive session between users enabled for different national languages at their respective nodes.

8. The method of claim 1 wherein
said transmitting step includes transmitting program messages in a non-interactive mode between users enabled for different national languages at their respective nodes.

9. The method of claim 1 which further includes
the steps of maintaining a compatibility identification for each node in the network to indicate which collection of messages have been provided to that node, and
if a message to be sent is not included in the collection of messages provided to a destination node, constructing and transmitting the message in a predetermined network language to the destination node for display in the network language.

10. The method of claim 1 wherein
the multi-lingual network includes first nodes which support program messages not supported by other nodes, and
a program message sent from said other nodes is constructed in their own national language, and a program message sent to said other nodes from one of said first nodes is constructed in a predetermined network language, thereby allowing said other nodes and first nodes to coexist in the same network.

11. The method of claim 1 wherein
enabling a node for a plurality of national languages for use by multiple local users in choosing one of those national languages for displaying program messages, and
said transmitting step includes transmitting program messages between nodes to local users which have chosen different national languages.

12. A network computer system comprising
means for determining a set of program messages available in a user's language at the node where said user enters the network,
means for identifying said set of program messages to some other node in the network by transmitting identifying information to said other node through the network,
means for determining at said other node whether a message to be issued to said user by said other node is included in said set of program messages,
means for transmitting a message from said other node to said node where the user entered the network in a standardized program-readable format independent of said user's languages,
means for constructing the message identified in said program-readable format in said user's language at said node where the user entered the network and displaying the constructed message to the user.

13. The system of claim 12 wherein
said program messages also include screen images.

14. The system of claim 12 which further comprises
a network having multiple nodes which are not all enabled for the same national language, and
each individual node has its own storage means for indicating selected national languages which are enabled at said individual node and for storing a predetermined collection of messages in said selected national languages.

15. The system of claim 14 wherein
said transmission means sends some messages in encoded form, and
each individual node has its own receiving means for decoding and displaying in one of the selected national languages messages sent to a user at said individual node or for processing and retransmitting the encoded messages to another destination node in the network.

16. The system of claim 15 wherein
the nodes in the network comprise a host computer with multiple users.

17. The system of claim 15 wherein
the nodes in the network comprise a processor unit.

18. The system of claim 17 wherein
said processor unit comprises a workstation.

19. The system of claim 17 wherein
said processor unit comprises a microcomputer.

20. The system of claim 15 wherein
the nodes in the network comprise an application program, and
the system further includes an interface with the application program which is language independent.

21. The system of claim 14 wherein
said storage means also includes means for storing and locating limited-length counterpart program messages corresponding to and having the same meaning as each of the program messages so that nodes which do not support said program messages can receive the counterpart messages in lieu of the program messages.

22. The system of claim 14 wherein
a different compatibility number is assigned to each different collection of program messages provided to each node in the network, and
said transmission means constructs and transmits a message in a predetermined network language when a comparison of compatibility numbers indicates that the program message is not included in the collection of messages provided to the destination node.

* * * * *